(12) United States Patent
Mimura et al.

(10) Patent No.: US 11,267,397 B2
(45) Date of Patent: Mar. 8, 2022

(54) AUTONOMOUS DRIVING VEHICLE INFORMATION PRESENTATION APPARATUS

(71) Applicant: HONDA MOTOR CO., LTD., Tokyo (JP)

(72) Inventors: Yoshitaka Mimura, Wako (JP); Takashi Oshima, Wako (JP); Yuji Tsuchiya, Wako (JP); Yuki Kizumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/117,224

(22) Filed: Dec. 10, 2020

(65) Prior Publication Data

US 2021/0170943 A1 Jun. 10, 2021

(30) Foreign Application Priority Data

Dec. 10, 2019 (JP) .............................. JP2019-223302

(51) Int. Cl.
*B60R 25/31* (2013.01)
*B60Q 1/50* (2006.01)
*B60Q 1/08* (2006.01)
*B60R 25/25* (2013.01)

(52) U.S. Cl.
CPC ............. *B60Q 1/503* (2013.01); *B60Q 1/08* (2013.01); *B60R 25/25* (2013.01); *B60R 25/31* (2013.01); *B60Q 2400/40* (2013.01); *B60R 2300/50* (2013.01)

(58) Field of Classification Search
CPC ...... B60Q 1/503; B60Q 1/08; B60Q 2400/40; B60R 25/25; B60R 25/31; B60R 2300/50
See application file for complete search history.

(56) References Cited

U.S. PATENT DOCUMENTS

| | | | |
|---|---|---|---|
| 9,494,938 B1* | 11/2016 | Kemler | G05D 1/0022 |
| 9,511,730 B1* | 12/2016 | Wu | G06K 9/00845 |
| 9,663,028 B2* | 5/2017 | Parkes | G08B 5/36 |
| 9,953,538 B1* | 4/2018 | Matthiesen | B60Q 1/268 |
| 10,336,188 B2* | 7/2019 | Torii | G06K 9/00845 |
| 10,636,301 B2* | 4/2020 | Wiebel-Herboth | B60Q 1/525 |
| 10,744,933 B2* | 8/2020 | Sasaki | B60K 35/00 |
| 10,821,891 B2* | 11/2020 | Morimura | B60Q 1/444 |

(Continued)

FOREIGN PATENT DOCUMENTS

| | | |
|---|---|---|
| JP | 2008-017227 A | 1/2008 |
| JP | 2017-199317 A | 11/2017 |

*Primary Examiner* — Nay Tun
(74) *Attorney, Agent, or Firm* — Rankin, Hill & Clark LLP

(57) ABSTRACT

In an autonomous driving vehicle information presentation apparatus, based on outside information, an identification unit searches for a person present around a host vehicle and identifies whether the person extracted by the search matches a user of the host vehicle. When a result of the identification by the identification unit indicates that the person extracted by the search matches the user of the host vehicle, the information presentation unit presents information by using a preset presenting state to a specific person, as a presentation target, identified to match the user of the host vehicle by the identification unit with an exterior display apparatus provided at a front portion of the host vehicle.

7 Claims, 11 Drawing Sheets

(56) References Cited

U.S. PATENT DOCUMENTS

| | | | | |
|---|---|---|---|---|
| 2003/0227375 A1* | 12/2003 | Yong | ............ | B60Q 1/503 |
| | | | | 340/425.5 |
| 2015/0032328 A1* | 1/2015 | Healey | ............ | G09F 21/049 |
| | | | | 701/36 |
| 2016/0023665 A1* | 1/2016 | Sherony | ............ | G02B 27/01 |
| | | | | 701/2 |
| 2017/0300053 A1* | 10/2017 | Wengreen | ............ | G08G 1/202 |
| 2018/0173237 A1* | 6/2018 | Reiley | ............ | B60Q 1/525 |
| 2018/0264945 A1* | 9/2018 | Torii | ............ | G08G 1/166 |
| 2018/0268701 A1* | 9/2018 | Sato | ............ | G08G 1/166 |
| 2019/0217773 A1* | 7/2019 | Sasaki | ............ | G09F 21/048 |
| 2019/0318159 A1* | 10/2019 | Blanc-Paques | ............ | B60W 40/08 |
| 2019/0337442 A1* | 11/2019 | Sorokin | ............ | B60W 50/0097 |
| 2020/0134338 A1* | 4/2020 | Wang | ............ | G10L 15/20 |
| 2020/0169564 A1* | 5/2020 | Tanriover | ............ | H04L 63/0861 |
| 2020/0223352 A1* | 7/2020 | Toshio Kimura | ............ | G06N 20/00 |
| 2020/0346580 A1* | 11/2020 | Salter | ............ | B60K 37/06 |

\* cited by examiner

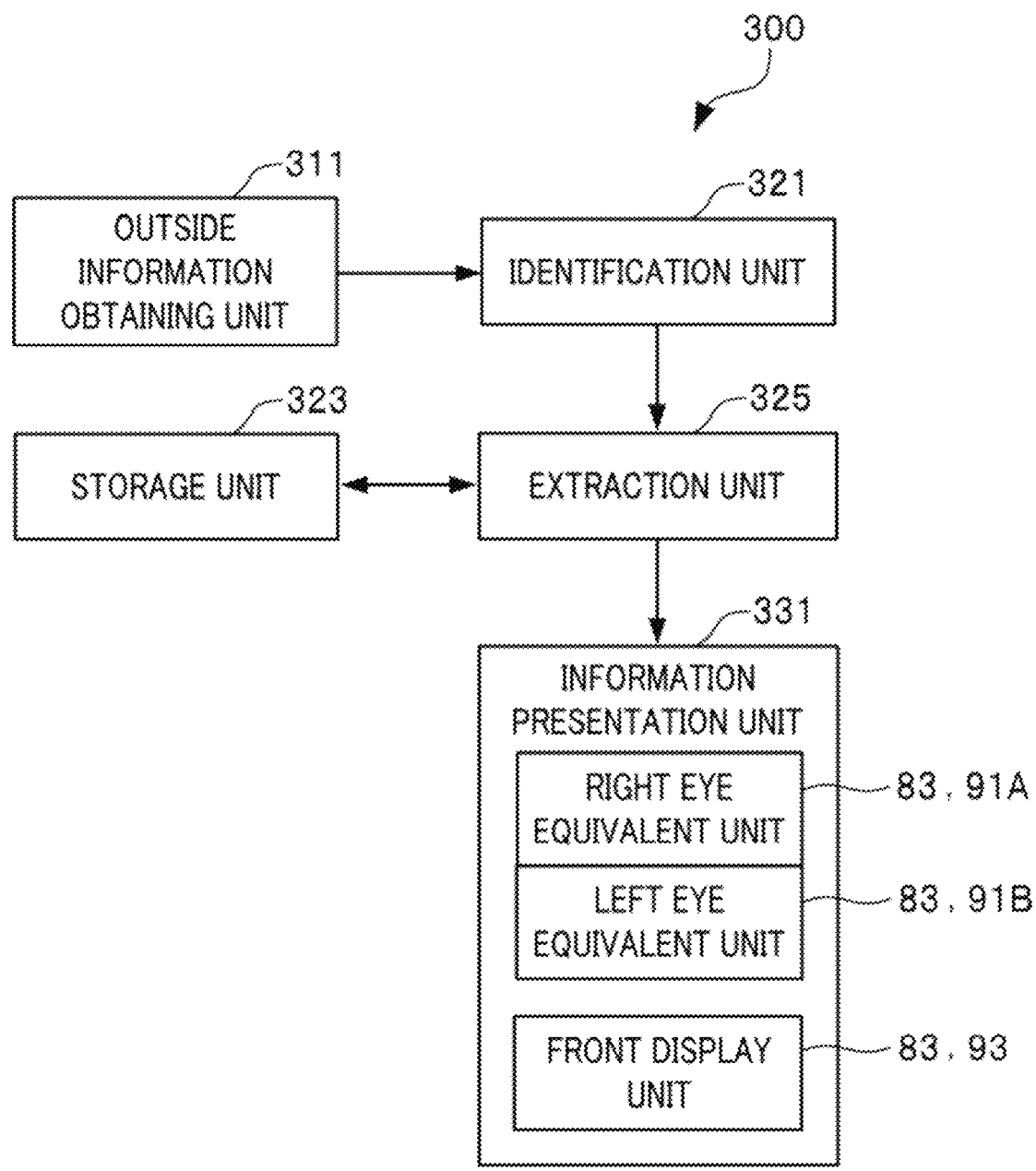

AUTONOMOUS DRIVING VEHICLE INFORMATION PRESENTATION APPARATUS

CROSS-REFERENCE TO RELATED APPLICATION

This application is based upon and claims priority from the Japanese Patent Application No. 2019-223302, filed on Dec. 10, 2019, the entire contents of which are incorporated herein by reference.

BACKGROUND OF THE INVENTION

1. Field of the Invention

The present invention relates to an autonomous driving vehicle information presentation apparatus capable of providing a user of an autonomous driving vehicle with the joy of possessing the vehicle.

2. Description of the Related Art

Recently, autonomous driving techniques have been vigorously proposed to achieve safe and comfortable driving of a vehicle while reducing the burden on the driver.

The applicant of the present application has disclosed an invention of a vehicle control system as an example of the autonomous driving technique that includes: a detection unit that detects the state of surroundings of a vehicle; an autonomous driving control unit that executes autonomous driving which autonomously controls as least one of the speed and steering of the vehicle based on the state of the surroundings of the vehicle detected by the detection unit; a recognition unit that recognizes the direction of a person from the vehicle based on the state of the surroundings of the vehicle detected by the detection unit; and an output unit that outputs information being recognizable by the person recognized by the recognition unit and having directivity in the direction of the person recognized by the recognition unit (see Japanese Patent Application Publication No. 2017-199317).

In the invention of the vehicle control system according to Japanese Patent Application Publication No. 2017-199317, information which is recognizable by a person recognized by the recognition unit and has directivity in the direction of the recognized person is outputted when a person is present around the host vehicle. This can reduce a sense of unease that the host vehicle may give to the person present around it.

Also, Japanese Patent Application Publication No. 2008-017227 discloses an invention of a facial recognition apparatus that is mounted on an automobile and includes: an image capture apparatus which captures an image of the face of a person present within a field of view for image capture; and a face registration unit in which facial feature information on a person registered as a user is stored in association with user identification information. The facial recognition apparatus performs a recognition process using the facial feature information on a facial image captured and the facial feature information registered in the face registration unit, and outputs the result of this recognition. If the recognition fails, the facial recognition apparatus turns on an illumination apparatus that illuminates the face of the person within the field of view for image capture, captures a facial image again, and performs a re-recognition process.

According to the invention of the traffic signal display apparatus according to Japanese Patent Application Publication No. 2008-017227, even when a clear image cannot be captured due to the presence of ambient light, insufficient light exposure, or the like, a facial image is captured again with an illumination light source turned on, and a re-recognition process is performed. In this way, the user recognition can be done without fail.

SUMMARY OF THE INVENTION

However, with the inventions according to Japanese Patent Application Publications Nos. 2017-199317 and 2008-107227, when a person recognized by an autonomous driving vehicle is a user of the vehicle, it is possible to attract the attention of this user but it is impossible to present unique information that meets the user's preferences. Thus, there is still room for improvement in prompting a user of an autonomous driving vehicle grow or foster a sense of attachment to the autonomous driving vehicle.

The present invention has been made in view of the above circumstances and makes it an object thereof to provide an autonomous driving vehicle information presentation apparatus capable of prompting a user of an autonomous driving vehicle to grow or foster a sense of attachment to the autonomous driving vehicle.

In order to solve the above-described problem, an autonomous driving vehicle information presentation apparatus according to a present invention (1) is an autonomous driving vehicle information presentation apparatus that is used in an autonomous driving vehicle which obtains outside information on an outside including targets present around a host vehicle, generates an action plan for the host vehicle based on the obtained outside information, and autonomously controls at least one of speed and steering of the host vehicle in accordance with the generated action plan, and that presents information to a person present around the host vehicle. A main characteristic feature of the autonomous driving vehicle information presentation apparatus is that it comprises: an identification unit that, based on the outside information, searches for a person present around the host vehicle and identifies whether the person extracted by the search matches a user of the host vehicle; and an information presentation unit that presents information addressed to the person by using an exterior display apparatus provided at a front portion of the host vehicle, in which when a result of the identification by the identification unit indicates that the person extracted by the search matches the user of the host vehicle, the information presentation unit presents the information by using a preset presenting state to a specific person, as a presentation target, identified to match the user of the host vehicle by the identification unit.

According to the present invention, it is possible to provide an autonomous driving vehicle information presentation apparatus capable of prompting a user of an autonomous driving vehicle to grow or foster a sense of attachment to the autonomous driving vehicle.

BRIEF DESCRIPTION OF THE DRAWINGS

FIG. 6A is a block configuration diagram conceptually illustrating functions of the autonomous driving vehicle information presentation apparatus.

DETAILED DESCRIPTION OF THE EMBODIMENTS

Figure 1:
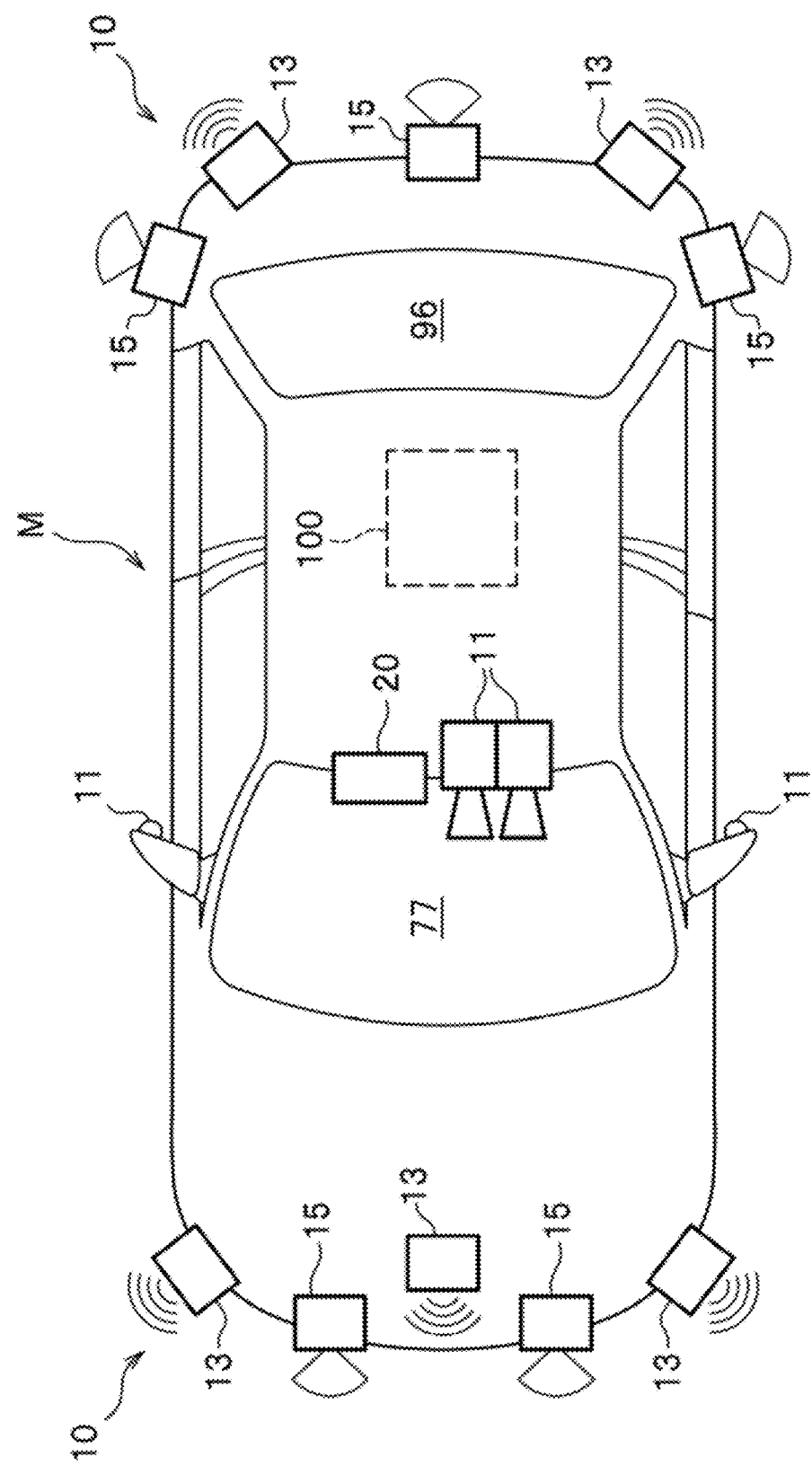
FIG. 1 is an entire configuration diagram of an autonomous driving vehicle including an information presentation apparatus according to an embodiment of the present invention.

Autonomous driving vehicle information presentation apparatuses according to embodiments of the present invention will be hereinafter described in detail with reference to the drawings.

Note that, in the drawings be presented below, members having the same function are denoted by the same reference sign. Moreover, the sizes and shapes of members may be changed or exaggerated and schematically illustrated for convenience of explanation.

When the terms "left" and "right" are used in relation to a host vehicle M in the description of the vehicle control apparatuses according to the embodiments of the present invention, they are based on the orientation of the host vehicle M. Specifically, in a case where the host vehicle M is, for example, right-hand drive, the driver's seat side will referred to as the right side, and the passenger's seat side will be referred to as the left side.

[Configuration of Host Vehicle M]

First of all, a configuration of an autonomous driving vehicle (hereinafter also referred to as "host vehicle") M including a vehicle control apparatus 100 according to an embodiment of present invention will be described with reference to FIG. 1.

FIG. 1 is an entire configuration diagram of the autonomous driving vehicle M including the vehicle control apparatus 100 according to the embodiment of the present invention.

As illustrated in FIG. 1, the host vehicle M equipped with the vehicle control apparatus 100 according to the embodiment of the present invention is an automobile, such as a two-wheeled, three-wheeled, or four-wheeled automobile, for example.

The host vehicle M includes an automobile with an internal combustion engine such as a diesel engine or a gasoline engine as a power source, an electric automobile with an electric motor as a power source, a hybrid automobile with both an internal combustion engine and an electric motor, and the like. Of these, the electric automobile is driven using electric power discharged from a cell such as a secondary cell, a hydrogen fuel cell, a metal fuel cell, or an alcohol fuel cell, for example.

As illustrated in FIG. 1, the host vehicle M is equipped with: an external sensor 10 having a function of detecting outside information on targets including objects and signs present around the host vehicle M; a navigation apparatus 20 having a function of mapping the current position of the host vehicle M onto a map, guiding the host vehicle M to a destination through a route, and so on; and the vehicle control apparatus 100 having a function of controlling self-driving of the host vehicle M including the steering and the acceleration and deceleration of the host vehicle M and so on.

These apparatuses and instruments are configured such that they are connected so as to be capable of communicating data to each other through a communication medium such as a controller area network (CAN), for example.

Note that the "vehicle control apparatus" may include other components (such as the external sensor 10 and an HMI 35) in addition to the components of the "vehicle control apparatus 100" according to this embodiment.

[External Sensor 10]

The external sensor 10 is configured of cameras 11, radars 13, and lidars 15.

The cameras 11 have an optical axis orientated toward the front side of the host vehicle and tilted obliquely downward, and has a function of capturing an image in the direction of advance of the host vehicle M. In an example, complementary metal oxide semiconductor (CMOS) cameras, charge coupled device (CCD) cameras, or the like can be used as the cameras 11 as appropriate. The cameras 11 are provided near the rearview mirror (not illustrated) inside the cabin of the host vehicle M and on a front portion of a right door and a front portion of a left door outside the cabin of the host vehicle M, or the like.

The cameras 11 repetitively capture images of, for example, a front side in the direction of advance, a right rear side, and a left rear side relative to the host vehicle M on a periodic basis. In this embodiment, the camera 11 provided near the rearview mirror is a pair of monocular cameras arranged side by side. The camera 11 may be a stereo camera.

The pieces of image information on the front side in the direction of advance, the right rear side, and the left rear side relative to the host vehicle M captured by the cameras 11 are transmitted to the vehicle control apparatus 100 through the communication medium.

The radars 13 have a function of obtaining distribution information on targets including a leading vehicle being a following target traveling ahead of the host vehicle M by emitting radar waves to the targets and receiving the radar waves reflected by the targets, the distribution information including the distances to the targets and the orientations of the targets. Laser beams, microwaves, millimeter waves, ultrasonic waves, or the like can be used as the radar waves as appropriate.

In this embodiment, five radars 13 are provided, three on the front side and two on the rear side, as illustrated in FIG. 1. The target distribution information obtained by the radars 13 is transmitted to the vehicle control apparatus 100 through the communication medium.

The lidars 15 (Light Detection and Ranging) have a function of detecting the presence of a target and the distance to a target by, for example, measuring the time taken to detect scattered light of emitted light. In this embodiment, five lidars 15 are provided, two on the front side and three on the rear side, as illustrated in FIG. 1. The target distribution information obtained by the lidars 15 is transmitted to the vehicle control apparatus 100 through the communication medium.

[Navigation Apparatus 20]

The navigation apparatus 20 is configured of a global navigation satellite system (GNSS) receiver, map information (navigation map), a touchscreen-type interior display apparatus 61 functioning as a human machine interface, speakers 63 (see FIG. 3 for these two), a microphone, and so on. The navigation apparatus 20 serves to locate the current position of the host vehicle M with the GNSS receiver and also to derive a route from the current position to a destination designated by the user.

The route derived by the navigation apparatus 20 is provided to a target lane determination unit 110 (described later) of the vehicle control apparatus 100. The current position of the host vehicle M may be identified ox complemented by an inertial navigation system (INS) utilizing the outputs of a vehicle sensor 30 (see FIG. 2). Also, while the vehicle control apparatus 100 is executing a manual driving mode, the navigation apparatus 20 navigates through a route to a destination by using sound and voice or by displaying a map.

Note that the function of locating the current position of the host vehicle M may be provided independently of the navigation apparatus 20. Also, the navigation apparatus 20 may be implemented by a function of a terminal apparatus such as a smartphone or tablet carried by the user, for example. In this case, information is transmitted and received between the terminal apparatus and the vehicle control apparatus 100 via wireless or wired communication.

[Vehicle Control Apparatus 100 and its Peripheral Components]

Next, the vehicle control apparatus 100 and its peripheral components mounted on the host vehicle M according to an embodiment of the present invention will be described with reference to FIG. 2.

Figure 2:
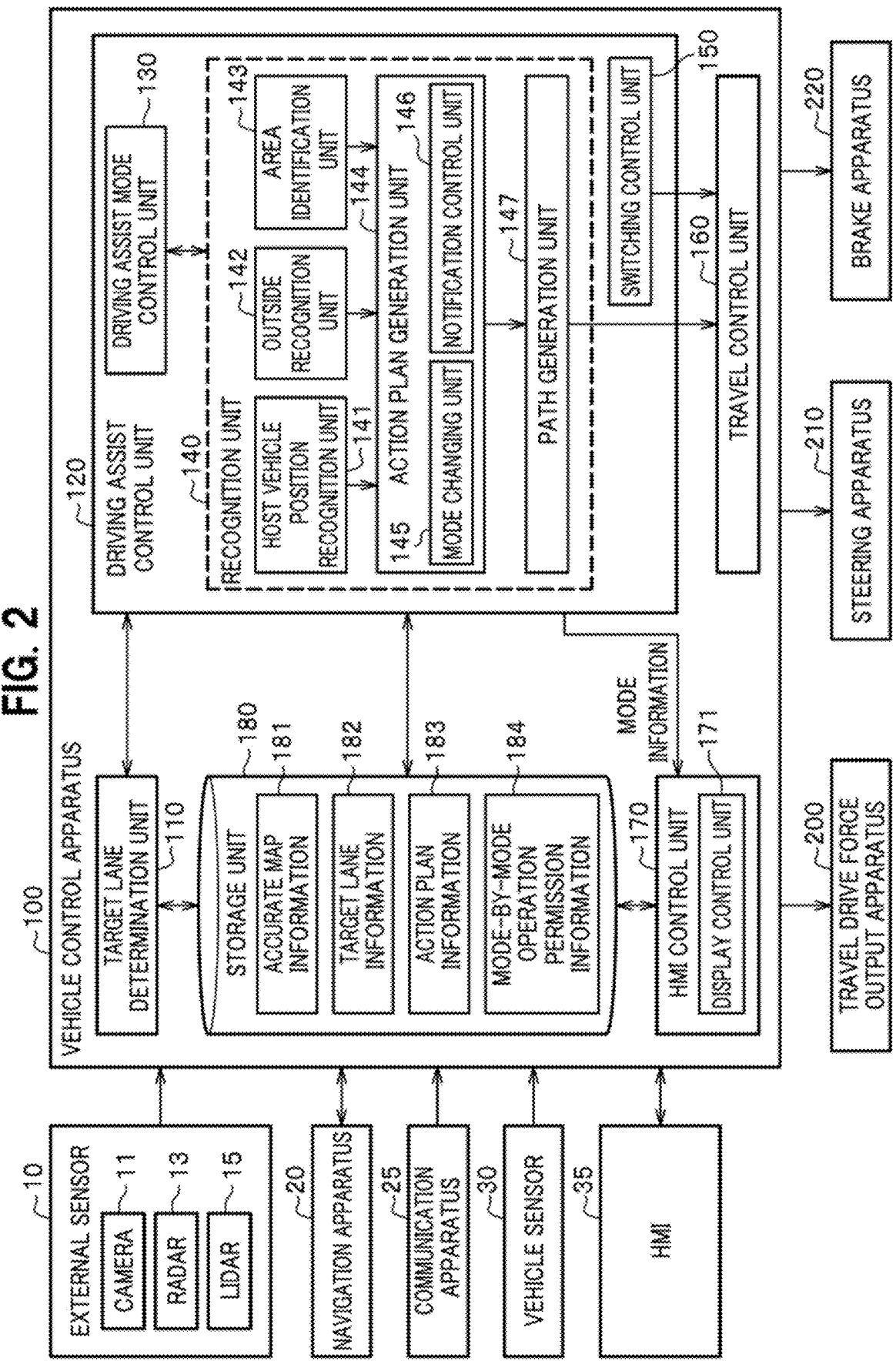
FIG. 2 is a functional block configuration diagram illustrating a vehicle control apparatus including an autonomous driving vehicle information presentation apparatus and its peripheral components according to an embodiment of the present invention.

FIG. 2 is a functional block configuration diagram illustrating the vehicle control apparatus 100 and its peripheral components according to the embodiment of the present invention.

As illustrated in FIG. 2, the host vehicle M is equipped with a communication apparatus 25, the vehicle sensor 30, the HMI 35, a travel drive force output apparatus 200, a steering apparatus 210, and a brake apparatus 220, as well as the above-described external sensor 10, navigation apparatus 20, and vehicle control apparatus 100.

The communication apparatus 25, the vehicle sensor 30, the HMI 35, the travel drive force output apparatus 200, the steering apparatus 210, and the brake apparatus 220 are configured such that they are connected to the vehicle control apparatus 100 so as to be capable of communicating data to and from the vehicle control apparatus 100 through the communication medium.

[Communication Apparatus 25]

The communication apparatus 25 has a function of performing communication through a wireless communication medium such as a cellular network, a Wi-Fi network, Bluetooth (registered trademark), or a dedicated short range communication (DSRC), for example.

The communication apparatus 25 wirelessly communicates with, for example, an information providing server of a system that monitors the traffic situations of roads, such as the Vehicle Information and Communication System (VICS) (registered trademark), and obtains traffic information indicating the traffic situation of the road which the host vehicle M is currently traveling or a road which the host vehicle M will be traveling. The traffic information contains pieces of information such as information on congestion ahead, information on the times required to pass through congested areas, information on accidents, failed vehicles, and construction, information on speed restrictions and lane closures, information on the locations of parking lots, and information on the availability of parking lots and rest areas.

The communication apparatus 25 may obtain the traffic information by, for example, communicating with a radio beacon provided on a side margin of the road or the like or performing vehicle-to-vehicle communication with another vehicle traveling around the host vehicle M.

The communication apparatus 25 also wirelessly communicates with, for example, an information providing server of the Traffic Signal Prediction Systems (TSPS) and obtains traffic signal information on traffic lights provided on the road which the host vehicle M is currently traveling or a road which the host vehicle M will be traveling. The TSPS serves to assist driving to smoothly cross intersections with traffic lights by using the traffic signal information on the traffic lights.

The communication apparatus 25 may obtain the traffic signal information by, for example, communicating with an optical beacon provided on a side margin of the road or the like or performing vehicle-to-vehicle communication with another vehicle traveling around the host vehicle M.

[Vehicle Sensor 30]

The vehicle sensor 30 has a function of detecting various pieces of information on the host vehicle M. The vehicle sensor 30 includes: a vehicle speed sensor that detects the vehicle speed of the host vehicle M; an acceleration sensor that detects the acceleration of the host vehicle M; a yaw rate sensor that detects the angular speed of the host vehicle M about a vertical axis; an orientation sensor that detects the orientation of the host vehicle M; a tilt angle sensor that detects the tilt angle of the host vehicle M; an illuminance sensor that detects the illuminance of the area where the host vehicle M is present; a raindrop sensor that detects the amount of raindrops at the area where the host vehicle M is present; and so on.

[Configuration of HMI 35]

Next, the HMI 35 will be described with reference to FIGS. 3, 4, 5A, and 5B.

Figure 3:
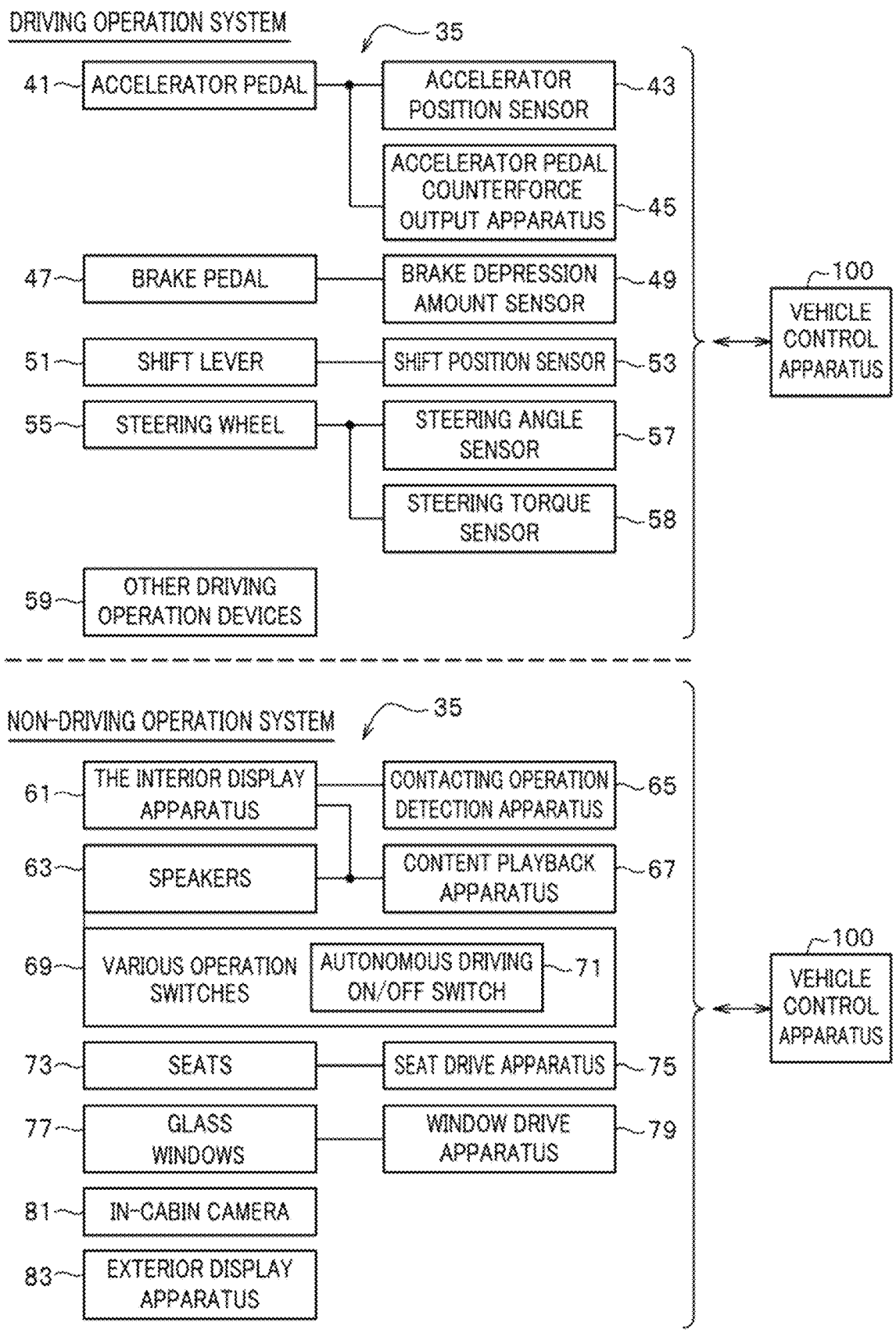
FIG. 3 is a schematic configuration diagram of a human machine interface (HMI) included in the autonomous driving vehicle information presentation apparatus.
Figure 4:
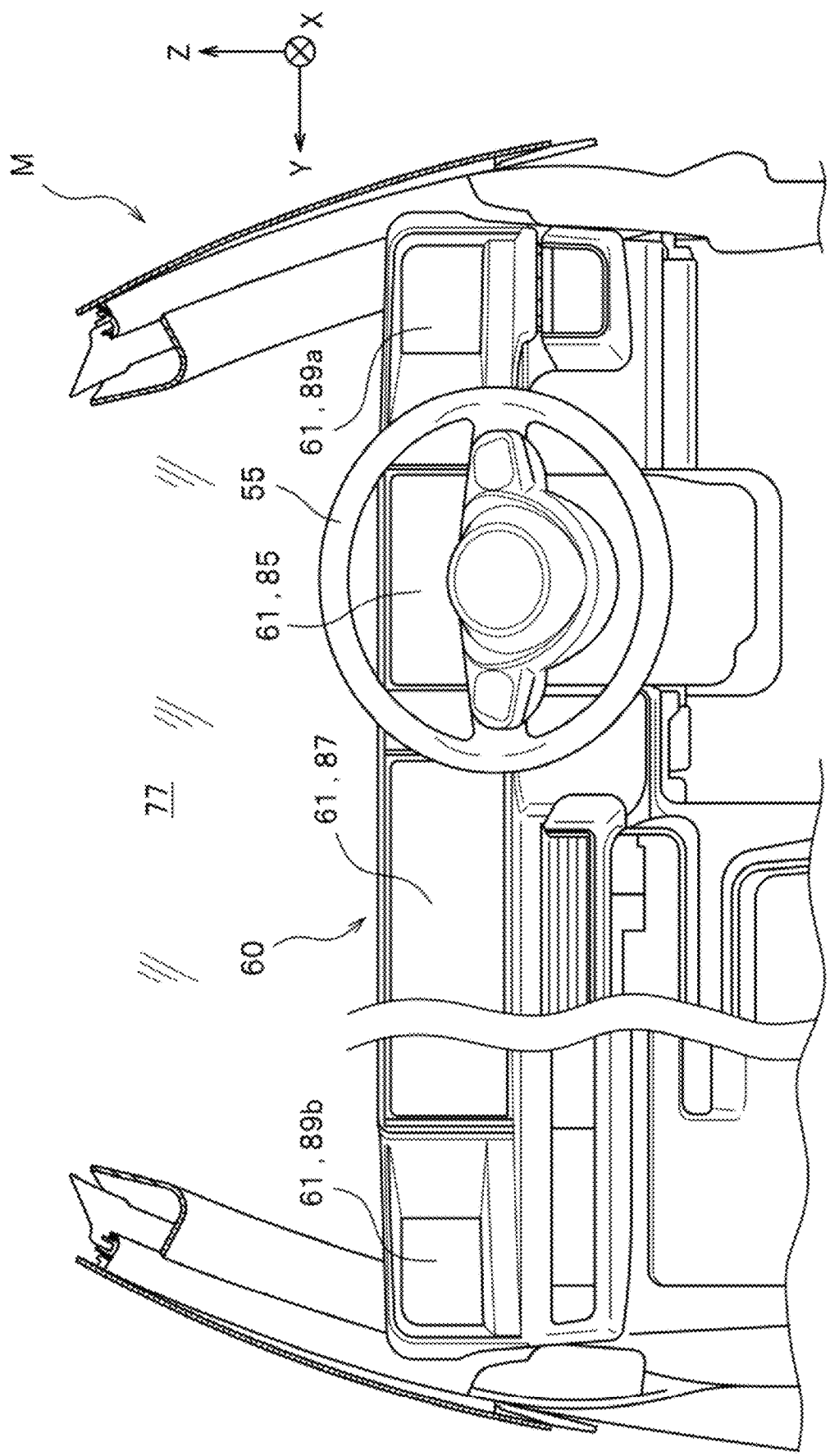
FIG. 4 is a diagram illustrating a front structure of the cabin of the autonomous driving vehicle.
Figure 5A:
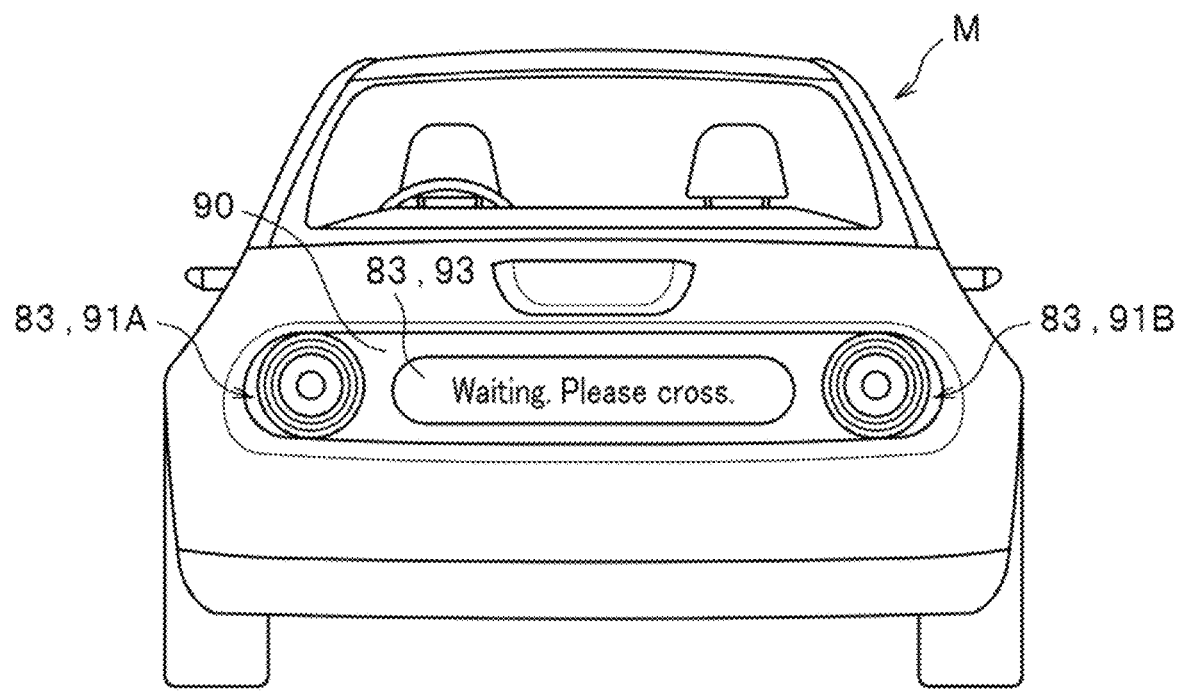
FIG. 5A is an exterior diagram illustrating a front structure of the autonomous driving vehicle.
Figure 5B:
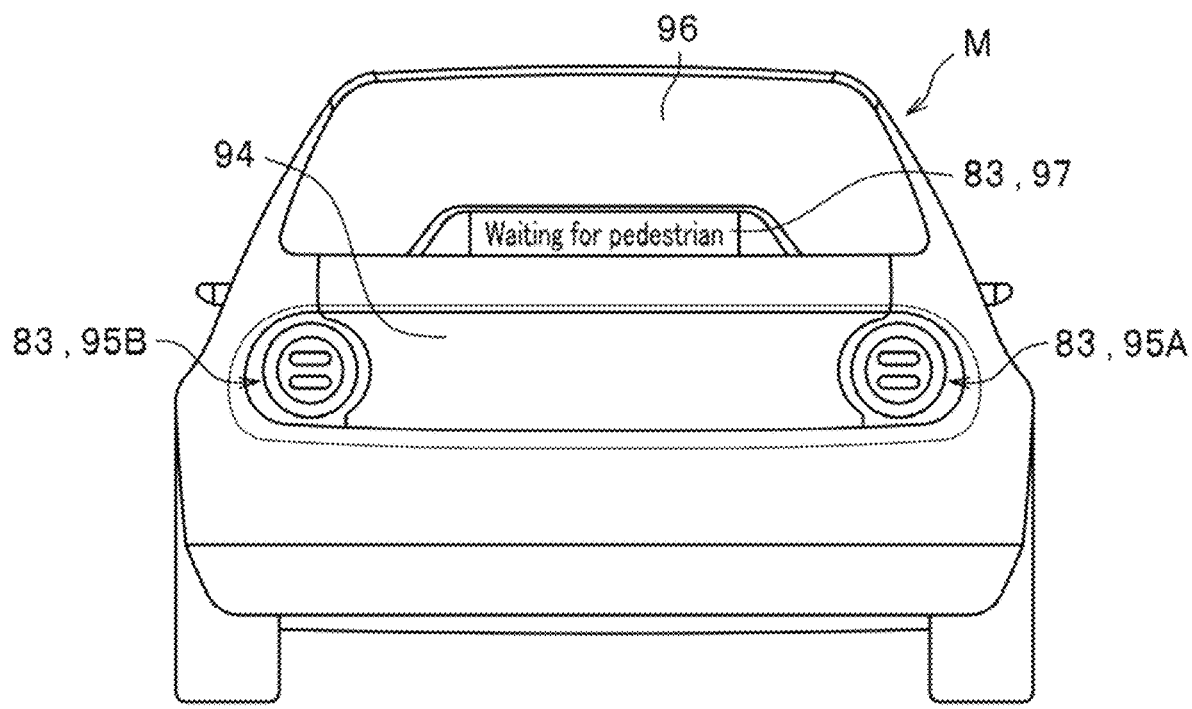
FIG. 5B is an exterior diagram illustrating a rear structure of the autonomous driving vehicle.

FIG. 3 is a schematic configuration diagram of the HMI 35 connected to the vehicle control apparatus 100 according to an embodiment of the present invention. FIG. 4 is a diagram illustrating a front structure of the cabin of the vehicle M including the vehicle control apparatus 100. FIGS. 5A and 5B are exterior diagrams illustrating a front structure and a rear structure of the vehicle M including the vehicle control apparatus 100, respectively.

As illustrated in FIG. 3, the HMI 35 includes constituent members of a driving operation system and constituent members of a non-driving operation system. There is no clear boundary between them, and a configuration in which constituent members of the driving operation system includes functions of the non-driving operation system (or vice versa) may be employed.

As illustrated in FIG. 3, the HMI 35 includes, as the constituent members of the driving operation system: an accelerator pedal 41, an accelerator position sensor 43, and an accelerator pedal counterforce output apparatus 45; a brake pedal 47 and a brake depression amount sensor 49; a shift lever 51 and a shift position sensor 53; a steering wheel 55, a steering angle sensor 57 and a steering torque sensor 58; and other driving operation devices 59.

The accelerator pedal 41 is an acceleration operator that receives an acceleration instruction (or a deceleration instruction with a returning operation) by the driver. The accelerator position sensor 43 detects the amount of depression of the accelerator pedal 41 and outputs an accelerator position signal indicating the amount of the depression to the vehicle control apparatus 100.

Note that a configuration may be employed which, instead of outputting the accelerator position signal to the vehicle control apparatus 100, outputs the accelerator position signal directly to the travel drive force output apparatus 200, the steering apparatus 210, or the brake apparatus 220. This applies also to the other components of the driving operation system to be described below. The accelerator pedal counterforce output apparatus 45 outputs a force (operation counterforce) to the accelerator pedal 41 in the opposite direction from the direction in which the accelerator pedal 41 is operated, for example, in accordance with an instruction from the vehicle control apparatus 100.

The brake pedal 47 is a deceleration operator that receives a deceleration instruction by the driver. The brake depression amount sensor 49 detects the amount of depression of (or the force of depression on) the brake pedal 47, and outputs a brake signal indicating the result of the detection to the vehicle control apparatus 100.

The shift lever 51 is a gearshift operator that receives a shift stage change instruction by the driver. The shift position sensor 53 detects a shift stage designated by the driver and outputs a shift position signal indicating the result of the detection to the vehicle control apparatus 100.

The steering wheel 55 is a steering operator that receives a turn instruction by the driver. The steering angle sensor 57 detects the operation angle of the steering wheel 55, and outputs a steering angle signal indicating the result of the detection to the vehicle control apparatus 100. The steering torque sensor 58 detects torque applied to the steering wheel 55, and outputs a steering torque signal indicating the result of the detection to the vehicle control apparatus 100.

The steering wheel 55 corresponds to a "driving operator" in the present invention.

The other driving operation devices 59 are, for example, a joystick, buttons, a rotary switch, a graphical user interface (GUI) switch, and so on. The other driving operation devices 59 receive an acceleration instruction, a deceleration instruction, a turn instruction, and so on and output them to the vehicle control apparatus 100.

As illustrated in FIG. 3, the HMI 35 includes, as the constituent members of the non-driving operation system: the interior display apparatus 61; the speakers 63; a contacting operation detection apparatus 65 and a content playback apparatus 67; various operation switches 69; seats 73 and a seat drive apparatus 75; glass windows 77 and a window drive apparatus 79; an in-cabin camera 81; and an exterior display apparatus 83, for example.

The interior display apparatus 61 is a display apparatus preferably of a touchscreen type having a function of displaying various pieces of information to the occupants in the cabin. As illustrated in FIG. 4, the interior display apparatus 61 includes, in an instrument panel 60: a meter panel 85 provided at a position directly opposite the driver's seat; a multi-information panel 87 horizontally elongated in the vehicle width direction (the Y-axis direction in FIG. 4) and provided so as to face the driver's seat and the passenger's seat; a right panel 89a provided on the driver's seat side in the vehicle width direction; and a left panel 89b provided on the passenger's seat side in the vehicle width direction. Note that the interior display apparatus 61 may be provided additionally at such a position as to face the rear seats (the back side of the all seats).

The meter panel 85 displays, for example, a speedometer, a tachometer, an odometer, shift position information, on/off information on lights, and so on.

The multi-information panel 87 displays, for example: map information on the area around the host vehicle M; information on the current position of the host vehicle M on the map; traffic information (including traffic signal information) on the road which the host vehicle M is currently traveling or a route which the host vehicle M will be traveling; traffic participant information on traffic participants (including pedestrians, bicycles, motorcycles, other vehicles, and so on) present around the host vehicle M; various pieces of information such as messages to be presented to the traffic participants; and so on.

The right panel 89a displays image information on a right rear side and a right lower side relative to the host vehicle M captured by the camera 11 provided on the right side of the host vehicle M.

The left panel 89b displays image information on a left rear side and a left lower side relative to the host vehicle M captured by the camera 11 provided on the left side of the host vehicle M.

The interior display apparatus 61 is not particularly limited. For example, it is formed of liquid crystal displays (LCDs), organic electroluminescence (EL) displays, or the like. The interior display apparatus 61 may be formed of head-up displays (HUDs) that project necessary images on the glass windows 77.

The speakers 63 have a function of outputting voice and sound. An appropriate number of speakers 63 are provided at appropriate positions inside the cabin such as in the instrument panel 60, the door panels, and the rear parcel shelf (none of which is illustrated), for example.

When the interior display apparatus 61 is of a touchscreen type, the contacting operation detection apparatus 65 has a function of detecting a touched position on any of the display screens of the interior display apparatus 61 and outputting information on the detected touched position to the vehicle control apparatus 100. The contacting operation detection apparatus 65 can omit this function when the interior display apparatus 61 is not of a touchscreen type.

The content playback apparatus 67 includes, for example, a digital versatile disc (DVD) playback apparatus, a compact disc (CD) playback apparatus, a television receiver, a playback apparatus for various guide images, and so on. Some or all of the interior display apparatus 61, the speakers 63, the contacting operation detection apparatus 65, and the content playback apparatus 67 may be components also used by the navigation apparatus 20.

The various operation switches 69 are arranged at appropriate positions inside the cabin. The various operation switches 69 include an autonomous driving ON/OFF switch 71 that issues an instruction to immediately start autonomous driving (or to start autonomous driving in the future) or to stop autonomous driving. The autonomous driving ON/OFF switch 71 may be a GUI switch or a mechanical switch. The various operation switches 69 may also include switches for driving the seat drive apparatus 75 and the window drive apparatus 79.

The seats 73 are seats for the occupants in the host vehicle M to sit on. The seat drive apparatus 75 freely drives the reclining angles, front-rear positions, yaw angles, and the like of the seats 73. The glass windows 77 are provided to all doors, for example. The window drive apparatus 79 drive the glass windows 77 so as to open or close them.

The in-cabin camera 81 is a digital camera utilizing a solid-state imaging element, such as a CCD or a CMOS. The in-cabin camera 81 is provided at such a position as to be capable of capturing an image of at least the head of the driver sitting on the driver's seat, such as in the rearview mirror, the steering boss (neither of which is illustrated), or the instrument panel 60. In an example, the in-cabin camera 81 repetitively captures an image of the inside of the cabin including the driver on a periodic basis, for example.

The exterior display apparatus 83 has a function of displaying various pieces of information to traffic participants present around the host vehicle M (including pedestrians, bicycles, motorcycles, other vehicles, and so on). As illustrated in FIG. 5A, the exterior display apparatus 83 includes, in a front grill 90 of the host vehicle M, a right front light unit 91A and a left front light unit 91B provided separated from each other in the vehicle width direction, and a front display unit 93 provided between the left and right front light units 91A and 91B.

As illustrated in FIG. 5B, the exterior display apparatus 83 also includes, in a rear grill 94 of the host vehicle M, a right rear light unit 95A and a left rear light unit 95B provided separated from each other in the vehicle width direction, and a rear display unit 97 provided at a position inside the cabin of the host vehicle M at which the rear display unit 97 is visible from outside through a center lower portion of a rear window 96. The rear display unit 97 is provided, for example, at the lower end of an opening for the rear window 96 (not illustrated) or the like.

Figure 5C:
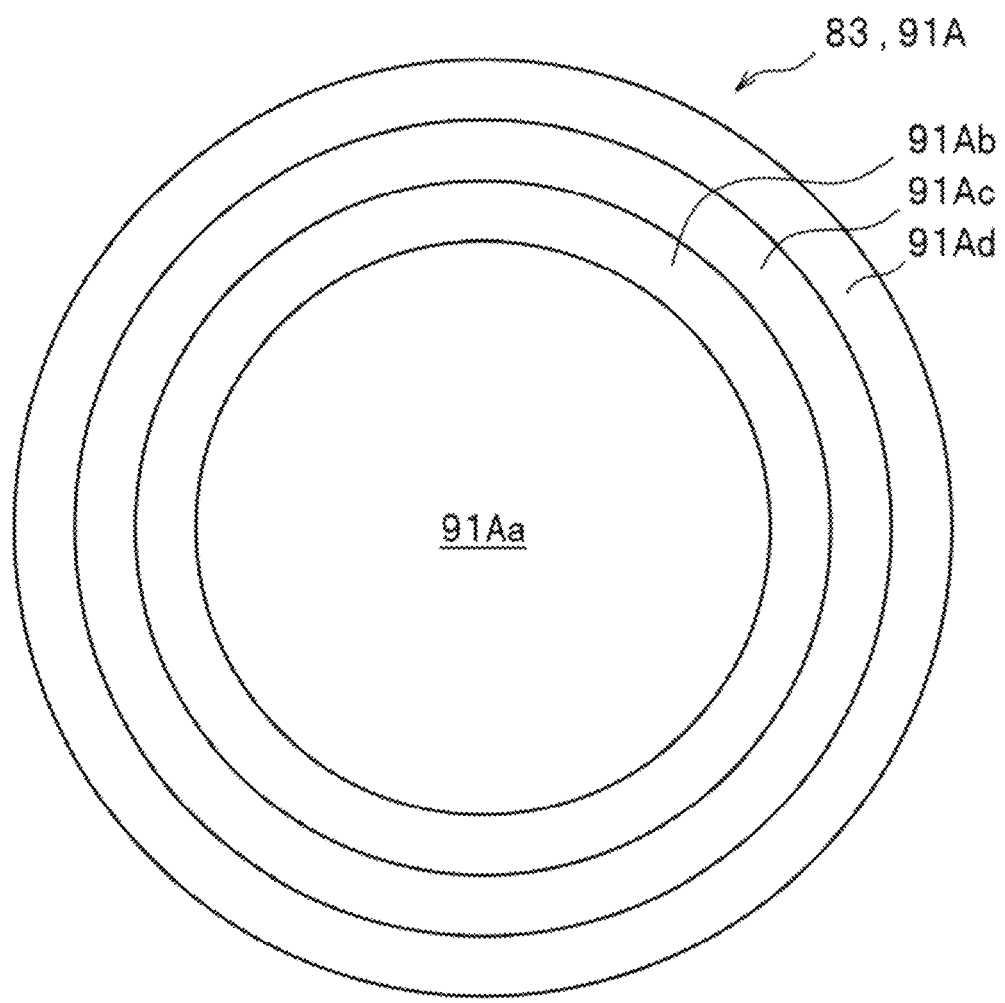
FIG. 5C is a front view illustrating a schematic configuration of a right front light unit included in the autonomous driving vehicle.

Here, the configurations of the left and right front light units 91A and 91B of the exterior display apparatus 83 will now be described with reference to FIG. 5C. FIG. 5C is a front view illustrating a schematic configuration of the right front light unit 91A included in the host vehicle M. Note that the left and right front light units 91A and 91B have the same configuration. Thus, the schematic configuration of the right front light unit 91A will be described as a description of the configurations of the left and right front light units 91A and 91B.

The right front light unit 91A is formed in a circular shape in a front view. The right front light unit 91A is configured such that a turn signal 91Ab, a light display part 91Ac, and a position lamp 91Ad each formed in an annular shape are arranged concentrically in this order toward the radially outer side and centered around a headlamp 91Aa formed in a circular shape in a front view having a smaller diameter than the outer diameter of the right front light unit 91A.

The headlamp 91Aa serves to assist the occupant to view ahead while the host vehicle M is traveling through a dark area by illuminating the front side in the direction of advance with light. The turn signal 91Ab serves to notify traffic participants present around the host vehicle M of an intention to turn left or right when the host vehicle M does so. The light display part 91Ac serves to notify traffic participants present around the host vehicle H of traveling intention of the host vehicle M including stopping (this will be described later in detail) along with a content displayed on the front display unit 93. The position lamp 91Ad serves to notify traffic participants present around the host vehicle M of its vehicle width while the host vehicle M is traveling through a dark area.

[Configuration of Vehicle Control Apparatus 100]

Next, referring back to FIG. 2, a configuration of the vehicle control apparatus 100 will be described.

The vehicle control apparatus 100 is implemented by, for example, at least one processor or hardware having an equivalent function. The vehicle control apparatus 100 may be configured of a combination of electronic control units (ECUs), micro-processing units (MPUs), or the like in each of which a processor such as a central processing unit (CPU), a storage apparatus, and a communication interface are connected by an internal bus.

The vehicle control apparatus 100 includes the target lane determination unit 110, a driving assist control unit 120, a travel control unit 160, an HMI control unit 170, and a storage unit 180.

The functions of the target lane determination unit 110 and the driving assist control unit 120 and part or entirety of the function of the travel control unit 160 are implemented by the processor executing programs (software). Also, some or all of these functions may be implemented by hardware such as a large scale integration (LSI) circuit or an application specific integrated circuit (ASIC) or be implemented by a combination of software and hardware.

In the following description, when a subject is mentioned like "~ unit does . . . ", the driving assist control unit 120 reads out the corresponding program from a read only memory (ROM) or an electrically erasable programmable read-only memory (EEPROM) as necessary, loads it into a random access memory (RAM), and executes the corresponding function (described later).

The program may be prestored in the storage unit 180, or taken into the vehicle control apparatus 100 from another storage medium or through a communication medium as necessary.

[Target Lane Determination Unit 110]

The target lane determination unit 110 is implemented by a micro processing unit (MRU), for example. The target lane determination unit 110 divides a route provided from the navigation apparatus 20 into a plurality of blocks (for example, divides the route at 100 [m]-intervals in the direction of advance of the vehicle), and determines a target lane in each block by referring to accurate map information 181. For example, the target lane determination unit 110 determines which lane from the left to travel. When, for example, a branching point, a merging point, or the like is present on the route, the target lane determination unit 110 determines the target lane such that the host vehicle M will be able to travel a rational traveling route for advancing to the target branched path. The target lane determined by the target lane determination unit 110 is stored in the storage unit 180 as target lane information 182.

[Driving Assist Control Unit 120]

The driving assist control unit 120 includes a driving assist mode control unit 130, a recognition unit 140, and a switching control unit 150.

<Driving Assist Mode Control Unit 130>

The driving assist mode control unit 130 determines an autonomous driving mode (autonomous driving assisting state) to be executed by the driving assist control unit 120 based on an operation of the HMI 35 by the driver, an event determined by an action plan generation unit 144, how the host vehicle M should travel determined by a path generation unit 147, and so on. The HMI control unit 170 is notified of the autonomous driving mode.

Each autonomous driving mode can be switched (overridden) to a lower-level autonomous driving mode by an operation of a constituent element of the driving operation system in the HMI 35.

The override is initiated, for example, when a constituent element of the driving operation system in the HMI 35 by the driver of the host vehicle M continues to be operated for longer than a predetermined time, when a predetermined amount of change in operation (e.g., the accelerator position of the accelerator pedal 41, the brake depression amount of the brake pedal 47, or the steering angle of the steering wheel 55) is exceeded, when a constituent element of the driving operation system is operated more than a predetermined number of times, or the like.

<Recognition Unit 140>

The recognition unit 140 includes a host vehicle position recognition unit 141, an outside recognition unit 142, an area identification unit 143, the action plan generation unit 144, and the path generation unit 147.

<Host Vehicle Position Recognition Unit 141>

The host vehicle position recognition unit 141 recognizes the traveling lane which the host vehicle M is currently traveling and the position of the host vehicle M relative to the traveling lane, based on the accurate map information 181 stored in the storage unit 180 and information inputted from the cameras 11, the radars 13, the lidars 15, the navigation apparatus 20, or the vehicle sensor 30.

The host vehicle position recognition unit 141 recognizes the traveling lane by comparing the pattern of road section lines recognized from the accurate map information 181 (e.g., the arrangement of continuous lines and broken lines) and the pattern of the road section lines around the host vehicle M recognized from images captured by the cameras 11. In this recognition, the current position of the host vehicle M obtained from the navigation apparatus 20 and the result of processing by the INS may be taken into account.

<Outside Recognition Unit 142>

As illustrated in FIG. 2, the outside recognition unit 142 recognizes an outside situation including, for example, the positions, vehicle speeds, and accelerations of nearby vehicles based on the information on the outside inputted from the external sensor 10 including the cameras 11, the radars 13, and the lidars 15. The nearby vehicles refer to, for example, other vehicles traveling around the host vehicle M in the same direction as the host vehicle M (a leading vehicle and a trailing vehicle; details will be described later).

The positions of the nearby vehicles may be represented as the centers of gravity of these other vehicles or representative points such as corners, or represented as areas expressed by the contours of the other vehicles. The states of the nearby vehicles may include the speeds and accelerations of the nearby vehicles and whether the nearby vehicles are changing lanes (or whether they are about to change lanes) which are figured out based on information from the above-mentioned various instruments. Alternatively, the outside recognition unit 142 may employ a configuration that recognizes the positions of targets including guard rails, utility poles, parked vehicles, pedestrians, and traffic signs, as well as the nearby vehicles including the leading vehicle and the trailing vehicle.

In embodiments of the present invention, of the nearby vehicles, the vehicle that is traveling immediately ahead of the host vehicle M in the same traveling lane as that of the host vehicle M and is a following target in following travel control will be referred to as "leading vehicle". Also, of the nearby vehicles, the vehicle that is traveling immediately behind the host vehicle M in the same traveling lane as that of the host vehicle M will be referred to as "trailing vehicle".

<Area Identification Unit 143>

The area identification unit 143 obtains information on specific areas present around the host vehicle M (interchanges: ICs, junctions: JCTs, and points where the number of lanes increases or decreases) based on map information. In this way, the area identification unit 143 can obtain information on specific areas that assist the host vehicle M to travel smoothly even if the host vehicle M is hidden behind vehicles ahead including the leading vehicle and cannot capture an image in the direction of advance with the external sensor 10.

Instead of obtaining the information on specific areas based on the map information, the area identification unit 143 may obtain the information on the specific areas by identifying targets with image processing based on an image in the direction of advance captured with the external sensor 10 or by recognizing targets based on the contours in an image in the direction of advance with internal processing by the outside recognition unit 142.

Also, a configuration may be employed which, as will be described later, uses the VICS information obtained by the communication apparatus 25 to enhance the accuracy of the information on the specific areas obtained by the area identification unit 143.

<Action Plan Generation Unit 144>

The action plan generation unit 144 sets the start point of autonomous driving and/or the destination point of the autonomous driving. The start point of the autonomous driving may be the current position of the host vehicle M or a geographical point at which an operation is performed as an instruction to perform the autonomous driving. The action plan generation unit 144 generates an action plan in the zone from this start point, to the destination point of the autonomous driving. Note that the action plan is not limited to the above, and the action plan generation unit 144 may generate action plans for any zones.

The action plan is formed of a plurality of events to be executed in turn, for example. Examples of the plurality of events include: a deceleration event in which the host vehicle M is caused to decelerate; an acceleration event in which the host vehicle M is caused to accelerate; a lane keep event in which the host vehicle M is caused to travel so as not to depart from its traveling lane; a lane change event in which the host vehicle M is caused to change its traveling lane; a passing event in which the host vehicle M is caused to pass the leading vehicle; a branching event in which the host vehicle M is caused to change to the desired lane at a branching point or to travel so as not to depart from the current traveling lane; a merge event in which the host vehicle M is in a merging lane for merging into a main lane and is caused to accelerate or decelerate and change its traveling lane; a handover event in which the host vehicle M is caused to transition from the manual driving mode to an autonomous driving mode (autonomous driving assisting state) at the start point of the autonomous driving or transition from the autonomous driving mode to the manual driving mode at the scheduled end point of the autonomous driving; and so on.

The action plan generation unit 144 sets a lane change event, a branching event, or a merge event at each point where the target lane determined by the target lane determination unit 110 changes. Information indicating the action plan generated by the action plan generation unit 144 is stored in the storage unit 180 as action plan information 183.

The action plan generation unit 144 includes a mode changing unit 145 and a notification control unit 146.

<Mode Changing Unit 145>

Based, for example, on the result of recognition of the targets present in the direction of advance of the host vehicle M by the outside recognition unit 142, the mode changing unit 145 selects a driving mode suitable for the recognition result from among driving modes including a plurality of preset levels of autonomous driving modes and the manual driving mode, and causes the host vehicle M to perform autonomous driving using the selected driving mode.

<Notification Control Unit 146>

When the mode changing unit 145 changes the driving mode of the host vehicle M, the notification control unit 146 issues a notice indicating the driving mode of the host vehicle M has been changed. The notification control unit 146, for example, causes the speakers 63 to output audio information prestored in the storage unit 180 to issue a notice indicating that the driving mode of the host vehicle M has been changed.

Note that the notice is not limited to an audio notice. The notice may be issued in the form of a display, emitted light, a vibration, or a combination of these as long as it can notify the driver of the change in the driving mode of the host vehicle M.

<Path Generation Unit 147>

The path generation unit 147 generates a path which the host vehicle M should travel, based on the action plan generated by the action plan generation unit 144.

<Switching Control Unit 150>

As illustrated in FIG. 2, the switching control unit 150 switches the driving mode between an autonomous driving mode and the manual driving mode based on a signal inputted from the autonomous driving ON/OFF switch 71 (see FIG. 3) and so on. Also, based on an operation of a constituent element of the driving operation system in the HMI 35 performed as an accelerating, decelerating, or steering instruction, the switching control unit 150 switches the current autonomous driving mode to a lower-level driving mode. For example, if a state where an operation amount indicated by a signal inputted from a constituent element of the driving operation system in the HMI 35 is above a threshold value continues for a reference time or longer, the switching control unit 150 switches (overrides) the current autonomous driving mode to a lower-level driving mode.

Also, the switching control unit 150 may perform switching control that brings the driving mode back to the original autonomous driving mode if detecting no operation on any constituent elements of the driving operation system in the HMI 35 for a predetermined time after the switching to the lower-level driving mode by the override.

<Travel Control Unit 160>

The travel control unit 160 controls travel of the host vehicle M by controlling the travel drive force output apparatus 200, the steering apparatus 210, and the brake apparatus 220 such that the host vehicle M will pass through the path generated by the path generation unit 147, which the host vehicle M should travel, on the scheduled time.

<HMI Control Unit 170>

When notified of setting information on the autonomous driving mode of the host vehicle M by the driving assist control unit 120, the HMI control unit 170 refers to mode-by-mode operation permission information 184 and controls the HMI 35 according to contents set for the autonomous driving mode.

As illustrated in FIG. 2, based on the information on the driving mode of the host vehicle M obtained from the driving assist control unit 120 and by referring to the mode-by-mode operation permission information 184, the HMI control unit 170 determines the apparatuses permitted to be used (the navigation apparatus 20 and part or entirety of the HMI 35) and the apparatuses not permitted to be used. Also, based on the result of the above determination, the HMI control unit 170 controls whether to accept the driver's operations of the driving operation system in the HMI 35 and the navigation apparatus 20.

For example, when the driving mode executed by the vehicle control apparatus 100 is the manual driving mode, the HMI control unit 170 accepts the driver's operations of the driving operation system in the HMI 35 (e.g., the accelerator pedal 41, the brake pedal 47, the shift lever 51, the steering wheel 55, and so on; see FIG. 3).

The HMI control unit 170 includes a display control unit 171.

<Display Control Unit 171>

The display control unit 171 controls displays on the interior display apparatus 61 and the exterior display apparatus 83. Specifically, for example, when the driving mode executed by the vehicle control apparatus 100 is an autonomous driving mode with a high degree of autonomy, the display control unit 171 performs control that causes the interior display apparatus 61 and/or the exterior display apparatus 83 to display information such as a reminder, warning, or driving assistance to traffic participants present around the host vehicle M. This will be described later in detail.

<Storage Unit 180>

The storage unit 180 stores pieces of information such as the accurate map information 181, the target, lane information 182, the action plan information 183, and the mode-by-mode operation permission information 184, for example. The storage unit 180 is implemented with a ROM, a RAM, a hard disk drive (HDD), a flash memory, or the like. The programs to be executed by the processor may be prestored in the storage unit 180 or downloaded from an external apparatus via in-vehicle Internet equipment or the like. Alternatively, the programs may be installed into the storage unit 180 by connecting a mobile storage medium storing the programs to a drive apparatus not illustrated.

The accurate map information 181 is map information that is more accurate than the normal map information included in the navigation apparatus 20. The accurate map information 181 contains, for example, information on the centers of lanes, information on the boundaries of the lanes, and so on. The boundaries of the lanes include the types, colors, and lengths of lane marks, the widths of roads, the widths of shoulders, the widths of main lanes, the widths of lanes, the positions of boundaries, the types of boundaries (guard rail, plant, and curb), hatched zones, and so on, and these boundaries are contained in an accurate map.

The accurate map information 181 may also contain road information, traffic regulation information, address information (addresses and postal codes), facility information, telephone number information, and so on. The road information contains information indicating the types of roads such as expressways, tollways, national highways, and prefectural roads, and information on the number of lanes in each road, the width of each lane, the gradient of the road, the position of the road (three-dimensional coordinates including the longitude, latitude, and height), the curvature of the lane, the positions of merging or branching points on the lane, the signs provided on the road, and so on. The traffic regulation information contains information such as the occurrence of lane closures due to construction, traffic accident, congestion, or the like.

[Travel Drive Force Output Apparatus 200, Steering Apparatus 210, and Brake Apparatus 220]

As illustrated in FIG. 2, the vehicle control apparatus 100 controls the drive of the travel drive force output apparatus 200, the steering apparatus 210, and the brake apparatus 220 in accordance with a travel control instruction from the travel control unit 160.

<Travel Drive Force Output Apparatus 200>

The travel drive force output apparatus 200 outputs drive force (torque) for causing the host vehicle M to travel to its drive wheels. When the host vehicle M is an automobile with an internal combustion engine as a power source, the travel drive force output apparatus 200 includes, for example, the internal combustion engine, a transmission, and an engine electronic control unit (ECU) that controls the internal combustion engine (none of which is illustrated).

Alternatively, when the host vehicle M is an electric automobile with an electric motor as a power source, the travel drive force output apparatus 200 includes a motor for traveling and a motor ECU that controls the motor for traveling (neither of which is illustrated).

Still alternatively, when the host vehicle M is a hybrid automobile, the travel drive force output apparatus 200 includes an internal combustion engine, a transmission, an engine ECU, a motor for traveling, and a motor ECU (none of which is illustrated).

When the travel drive force output apparatus 200 includes only an internal combustion engine, the engine ECU adjusts the throttle opening degree of the internal combustion engine, the shift stage, and so on in accordance with later-described information inputted from the travel control unit 160.

When the travel drive force output apparatus 200 includes only a motor for traveling, the motor ECU adjusts the duty ratio of a PWM signal to be applied to the motor for traveling in accordance with information inputted from the travel control unit 160.

When the travel drive force output apparatus 200 includes an internal combustion engine and a motor for traveling, the engine ECU and the motor ECU cooperate with each other to control the travel drive force in accordance with information inputted from the travel control unit 160.

<Steering Apparatus 210>

The steering apparatus 210 includes, for example, a steering ECU and an electric motor (neither of which is illustrated). The electric motor changes the direction of the turning wheels by exerting force on a rack-and-pinion mechanism, for example. The steering ECU drives the electric motor in accordance with information inputted from the vehicle control apparatus 100 or steering angle or steering torque information inputted, to thereby change the direction of the turning wheels.

<Brake Apparatus 220>

The brake apparatus 220 is, for example, an electric servo brake apparatus including a brake caliper, a cylinder that transfers hydraulic pressure to the brake caliper, an electric motor that generates the hydraulic pressure in the cylinder, and a braking control unit (none of which is illustrated). The braking control unit of the electric servo brake apparatus controls the electric motor in accordance with information inputted from the travel control unit 160 to output a brake torque corresponding to a braking operation to each wheel. The electric servo brake apparatus may include a mechanism, as a backup, that transfers hydraulic pressure generated by operating the brake pedal 47 to the cylinder through a master cylinder.

Note that the brake apparatus 220 is not limited to the above-described electric servo brake apparatus, and may be an electronically controlled hydraulic brake apparatus. The electronically controlled hydraulic brake apparatus controls an actuator in accordance with information inputted from the travel control unit 160 to transfer hydraulic pressure in a master cylinder to a cylinder. Also, the brake apparatus 220 may include a regenerative brake using a motor for traveling that can be included in the travel drive force output apparatus 200.

[Block Configuration of Autonomous Driving Vehicle Information Presentation Apparatus 300]

Next, a block configuration of an autonomous driving vehicle information presentation apparatus 300 according to an embodiment of the present invention included in the above-described vehicle control apparatus 100 will be described with reference to FIGS. 6A and 6B.

Figure 6B:
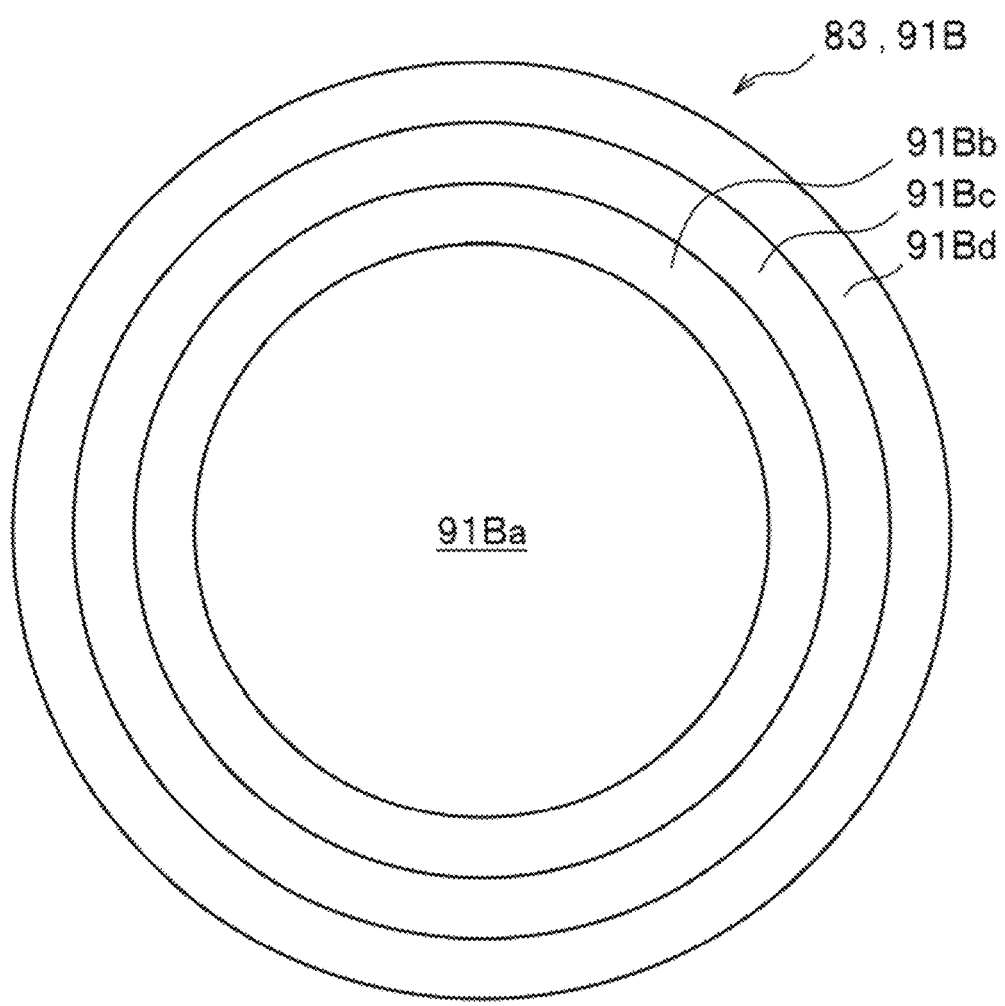
FIG. 6B is a front view illustrating a schematic configuration of a left front light unit included in the autonomous driving vehicle.

FIG. 6A is a block configuration diagram conceptually illustrating functions of the autonomous driving vehicle information presentation apparatus 300 according to the embodiment of the present invention. FIG. 6B is a front view illustrating a schematic configuration of the left front light unit 91B included in the autonomous driving vehicle M.

The left front light unit 91B illustrated in FIG. 6B is configured such that a turn signal 91Bb, a light display part 91Bc, and a position lamp 91Bd each formed in an annular shape are arranged concentrically in this order toward the radially outer side and centered around a headlamp 91Ba formed in a circular shape in a front view, like the right front light unit 91A illustrated in FIG. 5C. The right and left front light units 91A and 91B are used in the presentation of information by an information presentation unit 331 to be described next.

As illustrated in FIG. 6A, the autonomous driving vehicle information presentation apparatus 300 according to the embodiment of the present invention is configured of an outside information obtaining unit 311, an identification unit 321, a storage unit 323, an extraction unit 325, and the information presentation unit 331.

<Outside Information Obtaining Unit 311>

As illustrated in FIG. 6A, the outside information obtaining unit 311 has a function of obtaining outside information on the state of distribution of targets present in an area around the host vehicle M including areas ahead of and behind the host vehicle M in the direction of advance which are detected by the external sensor 10. The outside information obtaining unit 311 is a functional member corresponding to the recognition unit 140 of the vehicle control apparatus 100 illustrated in FIG. 2.

Note that the channel for the outside information obtaining unit 311 to obtain the outside information is not limited to the external sensor 10. For example, the navigation apparatus 20 and the communication apparatus 25 may be employed.

<Identification Unit 321>

As illustrated in FIG. 6A, the identification unit 321 has a function of, based on the outside information obtained by the outside information obtaining unit 311, searching for a person present around the host vehicle M and identifying whether the person extracted by the search matches a user registered in the host vehicle M. This identification may be implemented by, for example, performing a facial recognition process in which facial information on a person captured by any one of the cameras 11 is checked against facial information on each user registered in a database (not illustrated) to determine whether the person is recognized.

The identification unit 321 is a functional member corresponding to the recognition unit 140 of the vehicle control apparatus 100 illustrated in FIG. 2.

<Storage Unit 323>

As illustrated in FIG. 6A, the storage unit 323 has a function of storing information presenting states set for each of a plurality of users (including an information presenting state indicating that the user is being searched for) in association with the user. The information presenting states set for each user will be described later in detail.

The storage unit 323 is a functional member belonging to the recognition unit 140 of the vehicle control apparatus 100 illustrated in FIG. 2.

<Extraction Unit 325>

As illustrated in FIG. 6A, the extraction unit 325 has a function of extracting an information presenting state corresponding to a user of the host vehicle M identified by the identification unit 321 from among the contents stored in the storage unit 323.

The extraction unit 325 is a functional member belonging to the recognition unit 140 of the vehicle control apparatus 100 illustrated in FIG. 2.

<Information Presentation Unit 331>

As illustrated in FIG. 6A, the information presentation unit 331 has a function of presenting information to a specific person, as the presentation target, identified to match a user of the host vehicle M by the identification unit 321 by using an information presenting state corresponding to this user extracted by the extraction unit 325.

The information presentation unit 331 is configured of a right eye equivalent unit 91A (see FIGS. 5A and 5C), a left eye equivalent unit 91B (see FIGS. 5A and 6B), and the front display unit 93 (see FIG. 5A). The pair of eye equivalent units 91A and 91B and the front display unit 93 are each formed of a light emitting diode (LED) panel on which a plurality of LED lights are integrated, for example.

The pair of eye equivalent units 91A and 91B and the front display unit 93 correspond to the "exterior display apparatus 83" in the present invention.

The information presentation unit 331 is a functional member corresponding to the HMI control unit 170 of the vehicle control apparatus 100 illustrated in FIG. 2. The function of the information presentation unit 331 will be described later in detail.

The (pair of) right and left eye equivalent units 91A and 91B are functional members corresponding to the right and left front light units 91A and 91B (see FIG. 5A), respectively.

In the autonomous driving vehicle information presentation apparatus 300 according to the embodiment of the present invention, the (pair of) right and left eye equivalent units 91A and 91B, which are equivalent to eyes of the host vehicle M on the assumption that the host vehicle M is personified in a front view, are used as below. For example, a wandering sight line is expressed with the pair of eye equivalent units 91A and 91B during the search for a person present around the host vehicle M and, after a specific person (a user of the host vehicle M) is identified as a presentation target, information is presented to this specific person as the presentation target by expressing a sight line directed to the specific person with the pair of eye equivalent units 91A and 91B.

In this way, the host vehicle M communicates with the specific person (the user of the host vehicle M).

Also, the front display unit 93 has a function of displaying information addressed to a person present ahead of the host vehicle M in the direction of advance (in particular the specific person). In the autonomous driving vehicle information presentation apparatus 300 according to the embodiment of the present invention, a message addressed to the specific person identified to match the user of the host vehicle M by the identification unit 321 or the like is displayed by using the front display unit 93 to communicate with this specific person or the like.

[Operation of Autonomous Driving Vehicle Information Presentation Apparatus 300]

Next, the operation of the autonomous driving vehicle information presentation apparatus 300 according to an embodiment of the present invention will be described with reference to FIG. 7.

Figure 7:
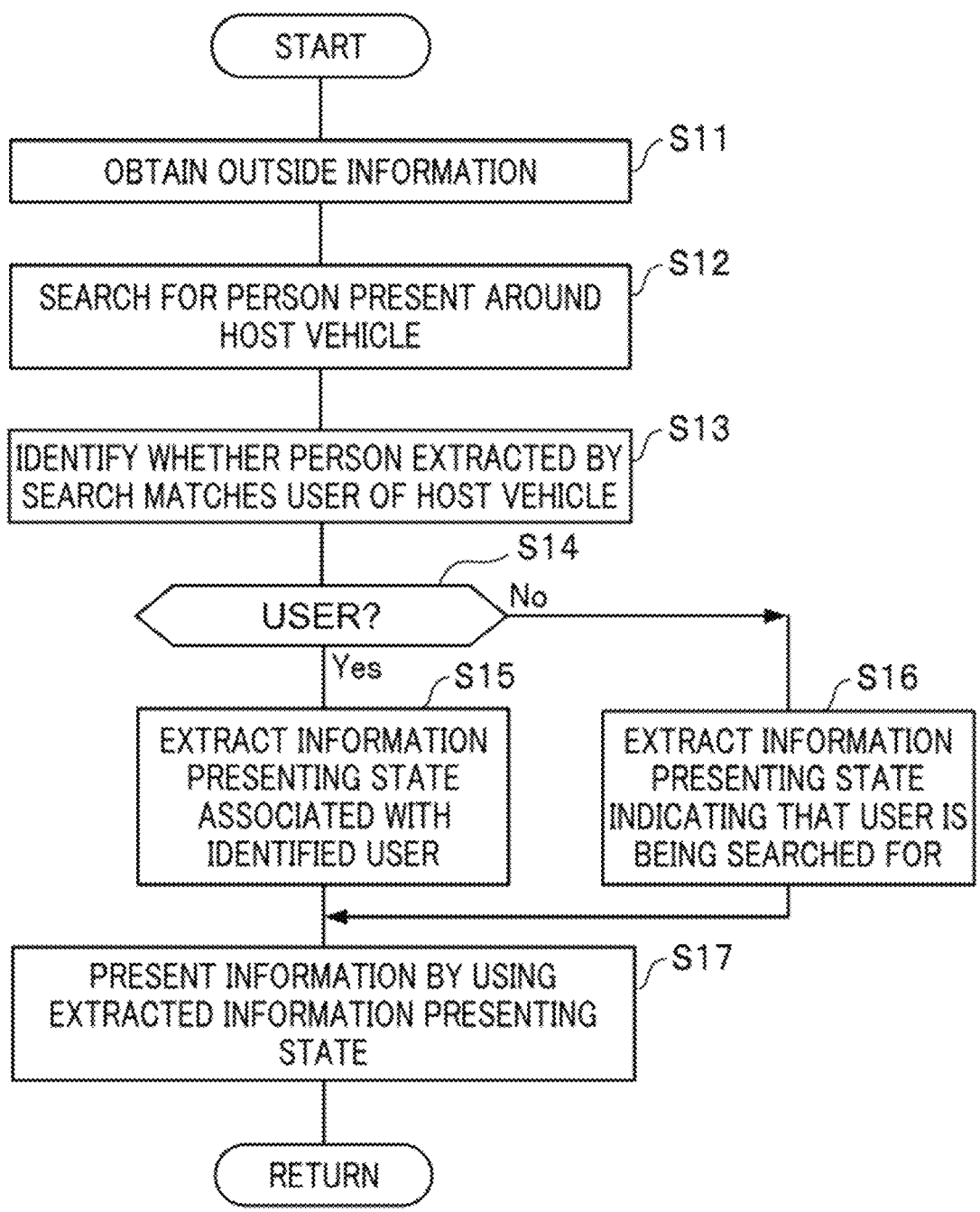
FIG. 7 is a flowchart to be used to describe the operation of the autonomous driving vehicle information presentation apparatus.

FIG. 7 is a flowchart to be used to describe the operation of the autonomous driving vehicle information presentation apparatus 300.

It is assumed that the autonomous driving vehicle (host vehicle) M equipped with the autonomous driving vehicle information presentation apparatus 300 is traveling in a preset level of autonomous driving mode.

In step S11 illustrated in FIG. 7, the outside information obtaining unit 311 obtains outside information on the state of distribution of targets present in an area around the host vehicle M including areas ahead of and behind the host vehicle M in the direction of advance which are detected by the external sensor 10.

In step S12, the identification unit 321 searches for a person present around the host vehicle M based on the outside information obtained by the outside information obtaining unit 311.

In step S13, the identification unit 321 identifies whether the person extracted by the search in step S12 matches a user registered in the host vehicle M.

In step S14, if the result of the identification in step S13 indicates that the person extracted by the search in step S12 matches a user registered in the host vehicle M, the autonomous driving vehicle information presentation apparatus 300 causes the process flow to advance to the next step S15.

On the other hand, if the result of the identification in step S13 indicates that the person extracted by the search in step S12 does not match any of the users registered in the host vehicle M, the autonomous driving vehicle information presentation apparatus 300 causes the process flow to advance to step S16.

In step S15, the extraction unit 325 extracts an information presenting state associated with the user of the host vehicle M identified by the identification unit 321 from among the contents stored in the storage unit 323.

In step S16, the extraction unit 325 extracts an information presenting state among the information presenting states associated with the user of the host vehicle M identified by the identification unit 321 which indicates that this user is being searched for from among the contents stored in the storage unit 323.

In step S17, the information presentation unit 331 presents information by using the information presenting state extracted by the extraction unit 325 in one of steps S15 and S16.

The information presenting states associated with a user of the host vehicle M will now be described.

The autonomous driving vehicle information presentation apparatus 300 according to the present invention enables the autonomous driving vehicle M called to come to its user's current location from a remote location, for example, to make communication between the host vehicle M and the user by behaving in a special way when finding the user on the way to the user's current location. In this way, the autonomous driving vehicle information presentation apparatus 300 prompts the user to grow or foster a sense of attachment to the autonomous driving vehicle M.

In view of this, an information presenting state associated with a user of the host vehicle M can be rephrased as a reaction state which the autonomous driving vehicle M exhibits when finding the user (to be precise, when a person extracted by the search matches the user of the host vehicle M).

Examples of this reaction state as variations of information presented using the exterior display apparatus 83 (the pair of eye equivalent units 91A and 91B and the front display unit 93) include: expressions involving changing a facial expression with two eyes (such as a wandering sight line, a following sight line, a brilliant smile, and a wink) using the pair of eye equivalent units 91A and 91B, which are equivalent to eyes of the host vehicle M on the assumption that the host vehicle M is personified in a front view; and expressions via a message with characters, signs, figures, or a combination of these using the front display unit 93.

Specifically, expressions involving changing a facial expression with two eyes (such as a wandering sight line, a following sight line, a brilliant smile, and a wink) can be made by, for example, using the pair of eye equivalent units 91A and 91B to express two eyes with a given shape and color, irises in a given direction, blinking with given timing, eyes closed for a given time, and a wink.

[Operation of Autonomous Driving Vehicle Information Presentation Apparatus 300 According to Embodiment of Present Invention]

Next, the operation of the autonomous driving vehicle information presentation apparatus 300 according to an embodiment of the present invention will be described with reference to FIGS. 8A to 8C and 9A to 9C.

Figure 8A:
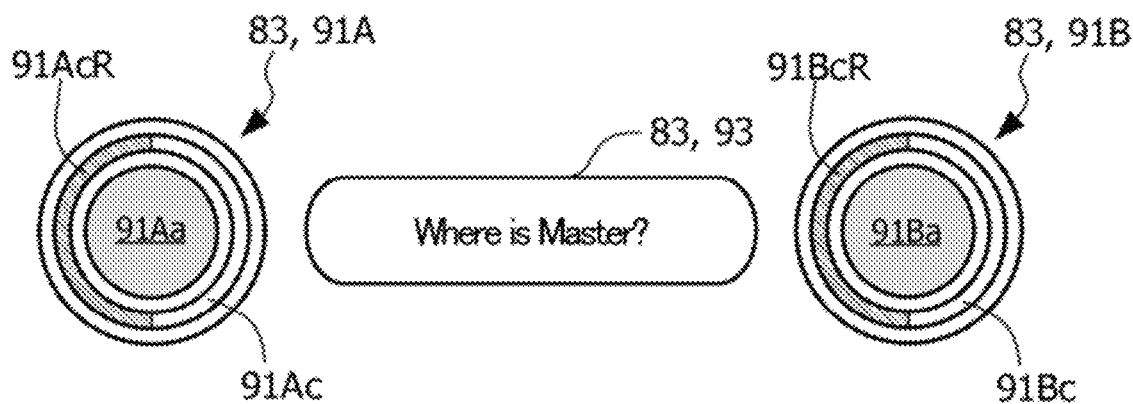
FIG. 8A is a diagram illustrating an exemplary change in behavior of the autonomous driving vehicle during a search for a person present around the autonomous driving vehicle.
Figure 8B:
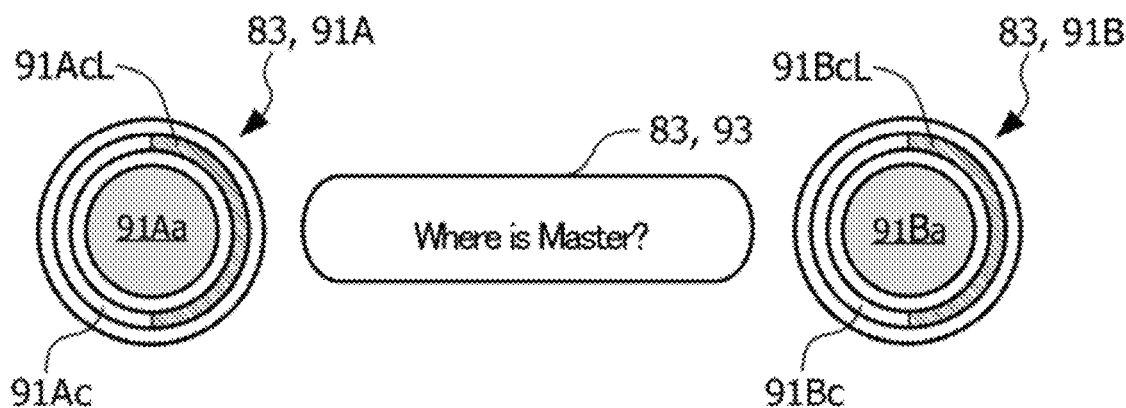
FIG. 8B is a diagram illustrating an exemplary change in behavior of the autonomous driving vehicle during the search for a person present around the autonomous driving vehicle.
Figure 8C:
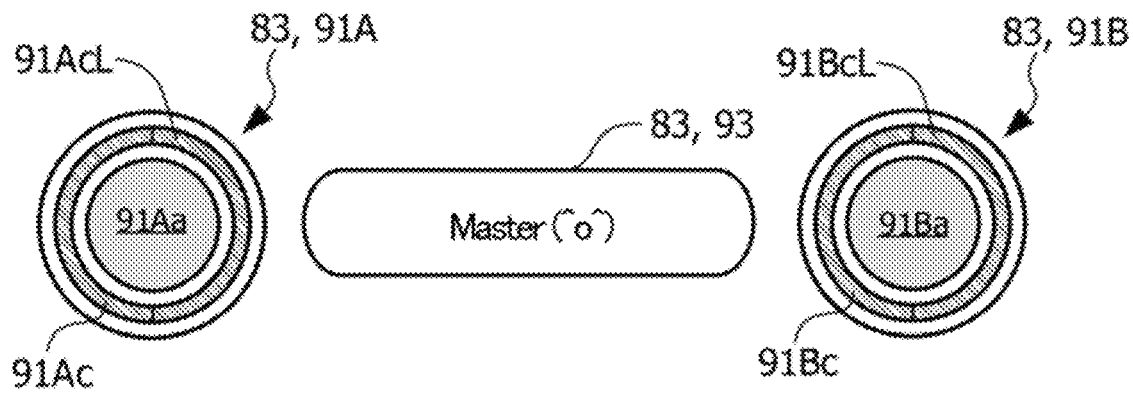
FIG. 8C is a diagram illustrating an exemplary change in behavior of the autonomous driving vehicle when its user is identified during the search for a person present around the autonomous driving vehicle.
Figure 9A:
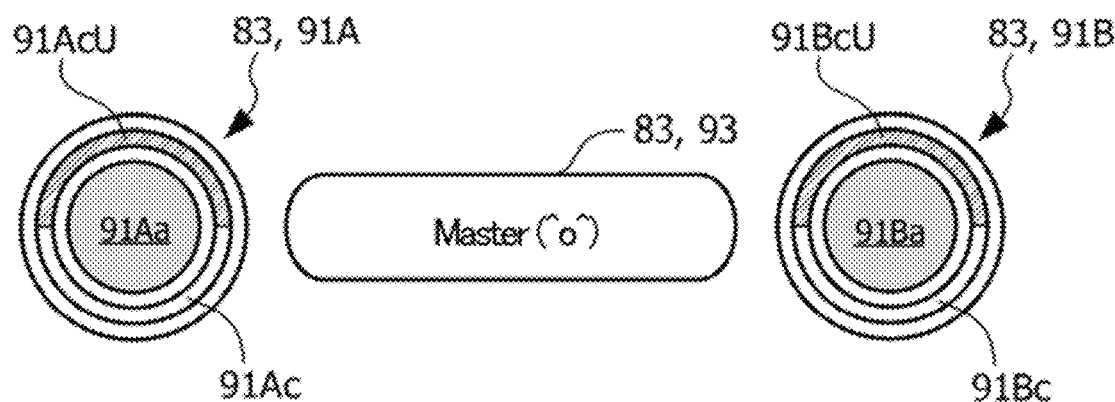
FIG. 9A is a diagram illustrating an example of affection of the autonomous driving vehicle for the user expressed after the autonomous driving vehicle has identified the user.
Figure 9B:
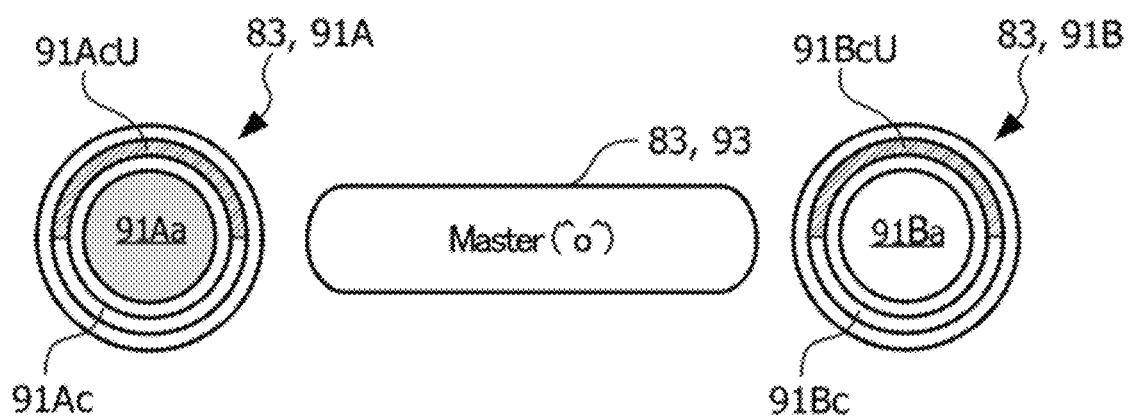
FIG. 9B is a diagram illustrating an example of the affection of the autonomous driving vehicle for the user expressed after the autonomous driving vehicle has identified the user.
Figure 9C:
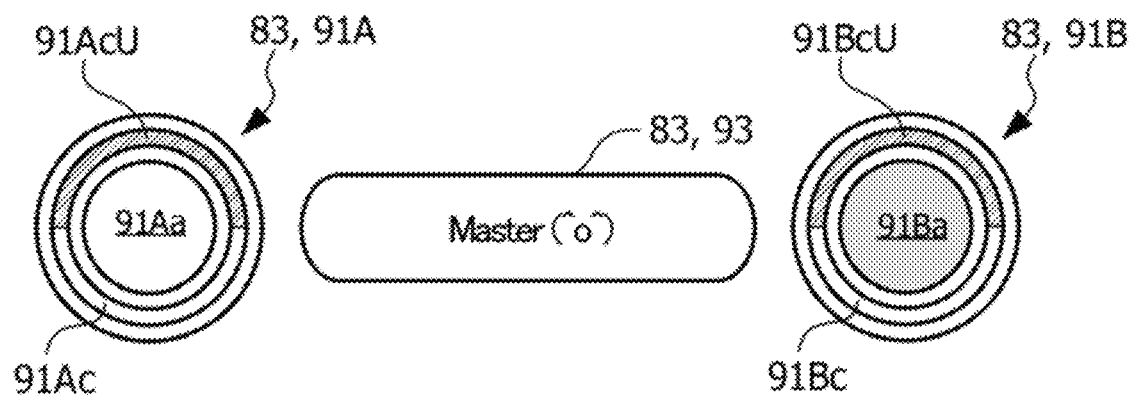
FIG. 9C is a diagram illustrating an example of the affection of the autonomous driving vehicle for the user expressed after the autonomous driving vehicle has identified the user.

FIGS. 8A and 8B are diagrams illustrating an exemplary change in behavior of the autonomous driving vehicle M during a search for a person present around the autonomous driving vehicle M. FIG. 8C is a diagram illustrating an exemplary change in behavior of the autonomous driving vehicle M when its user is identified during the search for a person present around the autonomous driving vehicle M. FIGS. 9A to 9C are diagrams illustrating examples of affection of the autonomous driving vehicle M for the user expressed after the autonomous driving vehicle M has identified the user.

The following description of the operation assumes a traveling scene as described below in which the user of the autonomous driving vehicle M uses a vehicle parking-delivery service called valet parking.

Specifically, the following description of the operation assumes a traveling scene in which, for example, the autonomous driving vehicle M is traveling from a parking lot of a facility, such as a hotel, toward an entrance thereof while the user of the vehicle M is at the entrance waiting for the vehicle M to return after handing the vehicle M to a staff member of a vehicle parking-delivery service at the entrance and finishing the user's affair in the facility.

In response to a delivery request received from the user of the autonomous driving vehicle M, a staff member of the vehicle parking-delivery service drives the autonomous driving vehicle M parked in the parking lot of the facility (this driving may be autonomous driving) along a delivery route leading to the entrance from the parking lot of the facility. Exemplary changes in behavior of the autonomous driving vehicle M in a front view along this delivery route are illustrated in FIGS. 8A to 8C.

In the traveling scene illustrated in FIGS. 8A and 8B, the autonomous driving vehicle M appears as if exhibiting an action of looking for the user (Master) while traveling along the delivery route toward the entrance of the facility at which the user is waiting.

Specifically, as illustrated in FIG. 5A, the right and left front light units 91A and 91B having a circular outer edge are provided separated from each other at the right and left ends of the front grill 90 in the vehicle width direction. This makes the right and left front light units 91A and 91B appear as both eyes of the host vehicle M on the assumption that the host vehicle M is personified in a front view.

Thus, as illustrated in FIG. 8A, a right half 91AcR of the annular right light display unit 91Ac in the right front light unit 91A is turned on (the portion turned on is illustrated with diagonal lines in FIG. 8A. The same applies below.) while the left half is turned off. Similarly, a right half 91BcR of the annular left light display unit 91Bc in the left front light unit 91B is turned on while the left half is turned off. As a result, the right and left front light units 91A and 91B appear as if looking right sideways on the assumption that the host vehicle M is personified in a front view.

Also, as illustrated in FIG. 8B, a left half 91AcL of the annular right light display unit 91Ac in the right front light unit 91A is turned on while the right half is turned off. Similarly, a left half 91BcL of the annular left light display unit 91Bc in the left front light unit 91B is turned on while the right half is turned off. As a result, the right and left front light units 91A and 91B appear as if looking left sideways on the assumption that the host vehicle M is personified in a front view.

The above-described lighting patterns in FIGS. 8A and 8B are each for a predetermined time and are switched back and forth. As a result, the right and left front light units 91A and 91B appear as if looking right and left sideways back and forth on the assumption that the host vehicle M is personified in a front view.

In other words, the right and left front light units (pair of eye equivalent units) 91A and 91B are used to express a wandering sight line, so that the host vehicle M appears as if exhibiting an action of looking for its user (Master).

Note that the right and left headlamps 91Aa and 91Ba are turned on in the example illustrated in FIGS. 8A and 8B, although the present invention is not particularly limited to this case.

In this case, a configuration may be employed which adjusts the optical axes of the right and left headlamps 91Aa and 91Ba such that the optical axes horizontally move to the right or the left in synchronization with the timing to change from one of the above-described lighting patterns in FIGS.

8A and 8B to the other in the same direction as that in which the right and left front light units 91A and 91B look sideways.

In addition, on the front display unit 93 provided between the right and left front light units 91A and 91B, a message such as "Where is Master?" is displayed as illustrated in FIGS. 8A and 8B during the search for a person present around the host vehicle M.

As a result, the information presentation unit 331 included in the autonomous driving vehicle (host vehicle) M exhibits an expression indicating that the host vehicle M is traveling toward the entrance of the facility at which the user (Master) is waiting with a sense of unease caused by not having the user by its side.

In the traveling scene illustrated in FIG. 8C, the autonomous driving vehicle M appears as if exhibiting an action of being happy to see the user (Master) while traveling along the delivery route toward the entrance of the facility at which the user is waiting.

Specifically, as illustrated in FIG. 8C, the information presentation unit 331 turns on the entire annular right light display unit 91Ac in the right front light unit 91A. Similarly, the information presentation unit 331 turns on the entire annular left light display unit 91Bc in the left front light unit 91B. As a result, the right and left front light units 91A and 91B appear as if widening the eyes and staring substantially ahead on the assumption that the host vehicle M is personified in a front view.

In other words, the host vehicle M appears as if exhibiting an action of being happy to see the user (Master).

Note that the right and left headlamps 91Aa and 91Ba are turned on in the example illustrated in FIG. 8C, although the present invention is not particularly limited to this case.

In this case, a configuration may be employed which adjusts the optical axes of the right and left headlamps 91Aa and 91Ba such that the optical axes horizontally move toward the right or the left so as to follow the movement of the user.

Also, as illustrated in FIG. 8C, a message such as "Master (^o^)" is displayed on the front display unit 93 provided between the right and left front light units 91A and 91B when the person extracted by the search is identified to match the user of the host vehicle M.

As a result, the information presentation unit 331 included in the autonomous driving vehicle (host vehicle) M exhibits an expression indicating that the host vehicle M is happy to see the user (Master).

FIGS. 9A to 9C are diagrams illustrating examples of affection of the autonomous driving vehicle M for the user (Master) expressed by using a wink, for example, after the autonomous driving vehicle M has identified the user.

Specifically, as illustrated in FIG. 9A, the information presentation unit 331 turns on an upper half 91AcU of the annular right light display unit 91Ac in the right front light unit 91A while turning off the lower half. Similarly, the information presentation unit 331 turns on an upper half 91BcU of the annular left light display unit 91Bc in the left front light unit 91B while turning off the lower half. As a result, the right and left front light units 91A and 91B appear as if brilliantly smiling due to the lighting effect of the upper halves 91AcU and 91BcU having a semicircular shape curved upward on the assumption that the host vehicle M is personified in a front view.

Note that the right and left headlamps 91Aa and 91Ba are turned on in the display example illustrated in FIG. 9A, although the present invention is not particularly limited to this case.

In this case, a configuration may be employed which adjusts the optical axes of the right and left headlamps 91Aa and 91Ba such that the optical axes horizontally move toward the right or the left so as to follow the movement of the user.

In addition, on the front display unit 93 provided between the right and left front light units 91A and 91B, a message such as "Master (^o^)" is displayed as illustrated in FIG. 9A while the affection for the user (Master) is expressed.

As a result, the information presentation unit 331 included in the autonomous driving vehicle (host vehicle) M can express a strong affection for the user "Master".

Here, the expression example illustrated in FIG. 9A and the expression example illustrated in FIG. 9B share many identical features as information presenting states. Thus, the difference between the expression examples illustrated in FIGS. 9A and 9B will be described as a description of the expression example illustrated in FIG. 9B.

The difference between the expression examples illustrated in FIGS. 9A and 9B is that the right and left headlamps 91Aa and 91Ba are turned on in the expression example illustrated in FIG. 9A whereas the right headlamp 91Aa is turned on and the left headlamp 91Ba is turned off in the expression example illustrated in FIG. 9B.

Also, the expression example illustrated in FIG. 9A and the expression example illustrated in FIG. 9C share many identical features as information presenting states. Thus, the difference between the expression examples illustrated in FIGS. 9A and 9C will be described as a description of the expression example illustrated in FIG. 9C.

The difference between the expression examples illustrated in FIGS. 9A and 9C is that the right and left headlamps 91Aa and 91Ba are turned on in the expression example illustrated in FIG. 9A whereas the left headlamp 91Ba is turned on and the right headlamp 91Aa is turned off in the expression example illustrated in FIG. 9C.

In sum, in the expression examples illustrated in FIGS. 9B and 9C, a wink involving turning off the right or left headlamp 91Aa or 91Ba (closing the right or left eye) is used to express the affection of the autonomous driving vehicle M for its user (Master) after the autonomous driving vehicle M identifies the user.

Note that the expression examples illustrated in FIGS. 9B and 9C are the same as the expression example illustrated in FIG. 9A in that a configuration may be employed which adjusts the optical axis of the headlamp turned on among the right and left headlamps 91Aa and 91Ba such that the optical axis horizontally moves toward the right or the left so as to follow the movement of the user.

[Operation and Advantageous Effects of Autonomous Driving Vehicle Information Presentation Apparatuses 300 According to Embodiments of Present Invention]

Next, operation and advantageous effects of the autonomous driving vehicle information presentation apparatuses 300 according to the embodiments of the present invention will be described.

An autonomous driving vehicle information presentation apparatus 300 based on an aspect (1) is based on an autonomous driving vehicle information presentation apparatus 300 that is used in an autonomous driving vehicle M which obtains outside information on an outside including targets present around a host vehicle M, generates an action plan for the host vehicle M based on the obtained outside information, and autonomously controls at least one of speed and steering of the host vehicle M in accordance with the generated action plan, and that presents information to person (traffic participants) present around the host vehicle M.

The autonomous driving vehicle information presentation apparatus 300 based on the aspect (1) includes: an identification unit 321 that, based on the outside information, searches for a person present around the host vehicle M and identifies whether the person extracted by the search matches a user of the host vehicle M; and an information presentation unit 331 that presents information addressed to the person by using an exterior display apparatus 33 provided at a front portion of the host vehicle M.

The information presentation unit 331 employs a configuration that, when a result of the identification by the identification unit 321 indicates that the person extracted by the search matches the user of the host vehicle M, presents the information by using a preset presenting state to a specific person, as a presentation target, identified to match the user of the host vehicle M by the identification unit 321.

In the autonomous driving vehicle information presentation apparatus 300 based on the aspect (1), based on the outside information, the identification unit 321 searches for a person present around the host vehicle M and identifies whether the person extracted by the search matches the user of the host vehicle M.

When the result of the identification by the identification unit 321 indicates that the person extracted by the search matches the user of the host vehicle M, the information presentation unit 331 presents the information by using the preset presenting state to the specific person, as the presentation target, identified to match the user of the host vehicle M by the identification unit 321 with the exterior display apparatus 83 (a pair of eye equivalent units 91A and 91B and a front display unit 93) provided at the front portion of the host vehicle M.

According to the autonomous driving vehicle information presentation apparatus 300 based on the aspect (1), when the result of the identification by the identification unit 321 indicates that the person extracted by the search matches the user of the host vehicle M, the information presentation unit 331 presents the information by using the preset presenting state to the specific person thus identified (user) as the presentation target with the exterior display apparatus 83 (the pair of eye equivalent units 91A and 91B and the front display unit 93) provided at the front portion of the host vehicle M. This enables communication between the host vehicle M and the user and can thus be expected to achieve an advantageous effect of prompting the user to grow or foster a sense of attachment to the autonomous driving vehicle M.

An autonomous driving vehicle information presentation apparatus 300 based on an aspect (2) is the autonomous driving vehicle information presentation apparatus 300 based on the aspect (1) in which the exterior display apparatus 83 includes a pair of eye equivalent units (right and left front light units) 91A and 91B provided at portions of the host vehicle M where headlights thereof are installed, and equivalent to eyes of the host vehicle M on an assumption that the host vehicle M is personified in a front view.

The information presentation unit 331 employs a configuration that expresses a wandering sight line with the pair of eye equivalent units 91A and 91B during the search for a person present around the host vehicle M, and presents the information to the specific person as the presentation target by expressing a sight line directed to the specific person with the pair of eye equivalent units 91A and 91B after the specific person is identified as the presentation target.

In the autonomous driving vehicle information presentation apparatus 300 based on the aspect (2), the information presentation unit 331 expresses a wandering sight line with the pair of eye equivalent units 91A and 91B during the search for a person present around the host vehicle M, and presents the information to the specific person as the presentation target by expressing a sight line directed to the specific person with the pair of eye equivalent units 91A and 91B after the specific person is identified as the presentation target.

According to the autonomous driving vehicle information presentation apparatus 300 based on the aspect (2), the information presentation unit 331 expresses a wandering sight line with the pair of eye equivalent units 91A and 91B during the search for a person present around the host vehicle M, and presents the information to the specific person as the presentation target by expressing a sight line directed to the specific person with the pair of eye equivalent units 91A and 91B after the specific person is identified as the presentation target. In this way, the degree of concern (loyalty) expressed for the specific person (user) can be varied before and after the specific person (user) is identified as the presentation target.

Enabling intimate communication between the host vehicle M and the user in this manner can enhance the advantageous effect of prompting the user to grow or foster a sense of attachment to the autonomous driving vehicle M.

An autonomous driving vehicle information presentation apparatus 300 based on an aspect (3) is the autonomous driving vehicle information presentation apparatus 300 based on the aspect (2) and may employ a configuration which further includes a front display unit 93 provided between the pair of eye equivalent units 91A and 91B, and in which after the specific person is identified as the presentation target, the information presentation unit 331 presents the information to the specific person as the presentation target by expressing a sight line directed to the specific person with the pair of eye equivalent units 91A and 91B and displaying a message addressed to the specific person with the front display unit 93.

In the autonomous driving vehicle information presentation apparatus 300 based on the aspect (3), after the specific person (user) is identified as the presentation target, the information presentation unit 331 presents the information to the specific person as the presentation target by expressing a sight line directed to the specific person with the pair of eye equivalent units 91A and 91B and displaying a message addressed to the specific person with the front display unit 93.

According to the autonomous driving vehicle information presentation apparatus 300 based on the aspect (3), after the specific person (user) is identified as the presentation target, the information presentation unit 331 presents the information to the specific person as the presentation target by expressing a sight line directed to the specific person with the pair of eye equivalent units 91A and 91B and displaying a message addressed to the specific person with the front display unit 93. In this way, the degree of concern (loyalty) expressed for the specific person (user) can be varied to a greater extent before and after the specific person (user) is identified as the presentation target.

Enabling more intimate communication between the host vehicle M and the user in this manner can further enhance the advantageous effect of prompting the user to grow or foster a sense of attachment, to the autonomous driving vehicle M.

An autonomous driving vehicle information presentation apparatus 300 based on an aspect (4) is the autonomous driving vehicle information presentation apparatus 300 based on the aspect (2) or (3) and may employ a configuration in which after the specific person (user) is identified as the presentation target, the information presentation unit 331 presents the information to the specific person as the presentation target by expressing affection for the specific person with a sight line directed to the specific person by using the pair of eye equivalent units 91A and 91B.

In the autonomous driving vehicle information presentation apparatus 300 based on the aspect (4), after the specific person (user) is identified as the presentation target, the information presentation unit 331 presents the information to the specific person as the presentation target by expressing affection for the specific person with a sight line directed to the specific person by using the pair of eye equivalent units 91A and 91B.

According to the autonomous driving vehicle information presentation apparatus 300 based on the aspect (4), after the specific person (user) is identified as the presentation target, the information presentation unit 331 presents the information to the specific person as the presentation target by expressing affection for the specific person with a sight line directed to the specific person by using the pair of eye equivalent units 91A and 91B. In this way, the degree of concern (loyalty) expressed for the specific person (user) can be varied to an even greater extent before and after the specific person (user) is identified as the presentation target.

Enabling even more intimate communication between the host vehicle M and the user in this manner can even further enhance the advantageous effect of prompting the user to grow or foster a sense of attachment to the autonomous driving vehicle M.

An autonomous driving vehicle information presentation apparatus 300 based on an aspect (5) is the autonomous driving vehicle information presentation apparatus 300 based on any one of the aspects (1) to (3) employing a configuration in which the information presenting state to be used by the information presentation unit 331 after the specific person is identified as the presentation target is set by the user.

In the autonomous driving vehicle information presentation apparatus 300 based on the aspect (5), the information presenting state to be used by the information presentation unit 331 after the specific person (user) is identified as the presentation target is set by the user.

According to the autonomous driving vehicle information presentation apparatus 300 based on the aspect (5), the information presenting state to be used by the information presentation unit 331 after the specific person is identified as the presentation target is set by the user. Thus, the user can set any one of various reaction states that meet the user's preferences as appropriate as the presented state of the information to be presented to the user when the autonomous driving vehicle M finds the user.

In this way, the degree of concern (loyalty) expressed for the specific person (user) can be varied to an even greater extent before and after the specific person (user) is identified as the presentation target.

Enabling even more intimate communication between the host vehicle M and the user in this manner can even further enhance the advantageous effect of prompting the user to grow or foster a sense of attachment to the autonomous driving vehicle M.

An autonomous driving vehicle information presentation apparatus 300 based on an aspect (6) is the autonomous driving vehicle information presentation apparatus 300 based on any one of the aspects (1) to (3) employing a configuration in which the information presentation unit 331 stops presenting the information to the specific person as the presentation target when the specific person gets into the host vehicle M.

In the autonomous driving vehicle information presentation apparatus 300 based on the aspect (6), when the specific person (user) gets into the host, vehicle M, the information presentation unit 331 assumes that it is no longer necessary to present the information addressed to the specific person as the presentation target, and stops presenting the information to the specific person as the presentation target.

According to the autonomous driving vehicle information presentation apparatus 300 based on the aspect (6), the information presentation unit 331 stops presenting the information to the specific person (user) as the presentation target when the specific person gets into the host vehicle M. This makes it possible to quickly finish presenting meaningless information addressed to the specific person who is no longer outside the host vehicle M.

An autonomous driving vehicle information presentation apparatus 300 based on an aspect (7) is the autonomous driving vehicle information presentation apparatus 300 based on any one of the aspects (1) to (3) employing a configuration in which when the host vehicle M is in an autonomous driving mode, the information presentation unit 331 presents information corresponding to the autonomous driving mode.

In the autonomous driving vehicle information presentation apparatus 300 based on the aspect (7), when the host vehicle M is in an autonomous driving mode, the information presentation unit 331 presents information corresponding to the autonomous driving mode, in consideration of the fact that information to be presented to the outside of the vehicle varies from one autonomous driving mode to another depending on the degree of autonomy.

According to the autonomous driving vehicle information presentation apparatus 300 based on the aspect (7), when the host vehicle M is in an autonomous driving mode, the information presentation unit 331 presents information corresponding to the autonomous driving mode. Thus, while the host vehicle M is traveling in an autonomous driving mode, information suitable for the degree of the autonomy can be presented to the outside of the vehicle. This enables the host vehicle M to communicate with a traffic participant present around the host vehicle M and as a result create a smooth traffic environment.

Other Embodiments

The plurality of embodiments described above represent examples of embodying the present invention. Therefore, the technical scope of the present invention shall not be interpreted in a limited manner by these embodiments. This is because the present invention can be implemented in various ways without departing from its gist or its main characteristic features.

For example, in the description of the autonomous driving vehicle information presentation apparatuses 300 according to the embodiments of the present invention, it is stated that the identification by the identification unit 321 can be implemented by, for example, performing a facial recognition process in which facial information on a person captured by any of the cameras 11 is checked against facial information on each user registered in a database to determine whether the person is recognized. However, the present invention is not limited to this example. The identification by the identification unit 321 may be implemented by, for example, performing a user identification process with a smart key (not illustrated) possessed by the user.

Also, in the description of the autonomous driving vehicle information presentation apparatuses 300 according to the embodiments of the present invention, the storage unit 323 has been described by exemplarily showing a configuration in which the storage unit 323 stores information presenting states set for each of a plurality of users in association with the user. However, the present invention is not limited to this example. A configuration may be employed in which information presenting states set for a single user are stored in association with this user as the contents stored in the storage unit 323.

Also, in the description of the autonomous driving vehicle information presentation apparatuses 300 according to the embodiments of the present invention, an example of expressing a wandering sight line by using the right and left front light units (pair of eye equivalent units) 91A and 91B has been described by exemplarily showing the lighting patterns with which the right and left front light units 91A and 91B look right and left sideways back and forth (see FIGS. 8A and 8B). However, the present invention is not limited to this example.

For example, a lighting control pattern may be prepared with which the annularly formed display surfaces of the right and left light display units 91Ac (see FIG. 5C) and 91Bc (see FIG. 6B) in the right and left front light units 91A and 91B are partially lighted and these partially lighted portions are moved horizontally toward the right or the left along a necessary time axis, and this lighting control pattern may be used when the direction of the eyes switches from the right to the left or vice versa in the lighting patterns with which the right and left front light units 91A and 91B look right or left sideways.

Lastly, the present invention can be implemented by providing a program that implements one or more of the functions according to the above-described embodiments to a system or an apparatus via a network or from a storage medium, and causing one or more processors in a computer of the system or the apparatus to read out and execute the program. Alternatively, the present invention may be implemented with a hardware circuit (e.g., ASIC) that implements one or more of the functions. Information including the program that implements the functions can be held in a recording apparatus such as a memory or a HDD or a recording medium such as a memory card or an optical disk.

What is claimed is:

1. An autonomous driving vehicle information presentation apparatus that is used in an autonomous driving vehicle which obtains outside information on an outside including targets present around a host vehicle, generates an action plan for the host vehicle based on the obtained outside information, and autonomously controls at least one of speed and steering of the host vehicle in accordance with the generated action plan, and that presents information to a person present around the host vehicle, the autonomous driving vehicle information presentation apparatus comprising:

an identification unit that, based on the outside information, searches for a person present around the host vehicle and identifies whether the person extracted by the search matches a user of the host vehicle, the identification unit being configured as a processor that executes a program; and an information presentation unit that presents information addressed to the person by using an exterior display apparatus provided at a front portion of the host vehicle, wherein when a result of the identification by the identification unit indicates that the person extracted by the search matches the user of the host vehicle, the information presentation unit presents the information by using a preset presenting state to a specific person, as a presentation target, identified to match the user of the host vehicle by the identification unit, the exterior display apparatus includes a pair of eye equivalent units provided at portions of the host vehicle where headlights thereof are installed, and equivalent to eyes of the host vehicle on an assumption that the host vehicle is personified in a front view, and the information presentation unit presents the information to the specific person as the presentation target by expressing a sight line directed to the specific person with the pair of eye equivalent units after the specific person is identified as the presentation target.

2. The autonomous driving vehicle information presentation apparatus according to claim 1, further comprising a front display unit provided between the pair of eye equivalent units, wherein after the specific person is identified as the presentation target, the information presentation unit presents the information to the specific person as the presentation target by expressing the sight line directed to the specific person with the pair of eye equivalent units and displaying a message addressed to the specific person with the front display unit.

3. The autonomous driving vehicle information presentation apparatus according to claim 1, wherein after the specific person is identified as the presentation target, the information presentation unit presents the information to the specific person as the presentation target by expressing affection for the specific person with the sight line directed to the specific person by using the pair of eye equivalent units.

4. The autonomous driving vehicle information presentation apparatus according to claim 1, wherein the information presenting state to be used by the information presentation unit after the specific person is identified as the presentation target is set by the user.

5. The autonomous driving vehicle information presentation apparatus according to claim 1, wherein the information presentation unit stops presenting the information to the specific person as the presentation target when the specific person gets into the host vehicle.

6. The autonomous driving vehicle information presentation apparatus according to claim 1, wherein when the host vehicle is in an autonomous driving mode, the information presentation unit presents information corresponding to the autonomous driving mode.

7. An autonomous driving vehicle information presentation apparatus that is used in an autonomous driving vehicle which obtains outside information on an outside including targets present around a host vehicle, generates an action plan for the host vehicle based on the obtained outside information, and autonomously controls at least one of speed and steering of the host vehicle in accordance with the generated action plan, and that presents information to a person present around the host vehicle, the autonomous driving vehicle information presentation apparatus comprising:

an identification unit that, based on the outside information, searches for a person present around the host vehicle and identifies whether the person extracted by the search matches a user of the host vehicle, the identification unit being configured as a processor that executes a program; and an information presentation unit that presents information addressed to the person by using an exterior display apparatus provided at a front portion of the host vehicle, wherein when a result of the identification by the identification unit indicates that the person extracted by the search matches the user of the host vehicle, the information presentation unit presents the information by using a preset presenting state to a specific person, as a presentation target, identified to match the user of the host vehicle by the identification unit, the exterior display apparatus includes a pair of eye equivalent units provided at portions of the host vehicle where headlights thereof are installed, and equivalent to eyes of the host vehicle on an assumption that the host vehicle is personified in a front view, and the information presentation unit expresses a wandering sight line with the pair of eye equivalent units during the search.

\* \* \* \* \*